(12) United States Patent
Moers et al.

(10) Patent No.: US 12,467,042 B2
(45) Date of Patent: Nov. 11, 2025

(54) LIPASE ENZYME

(71) Applicant: DERMAPHARM AKTIENGESELLSCHAFT, Grünwald (DE)

(72) Inventors: Christopher Moers, Münster (DE); Ingo Aldag, Münster (DE)

(73) Assignee: DERMAPHARM AKTIENGESELLSCHAFT, Grünwald (DE)

( * ) Notice: Subject to any disclaimer, the term of this patent is extended or adjusted under 35 U.S.C. 154(b) by 358 days.

(21) Appl. No.: 17/999,980

(22) PCT Filed: Jun. 24, 2021

(86) PCT No.: PCT/EP2021/067419
§ 371 (c)(1),
(2) Date: Nov. 28, 2022

(87) PCT Pub. No.: WO2021/260148
PCT Pub. Date: Dec. 30, 2021

(65) Prior Publication Data
US 2023/0220360 A1 Jul. 13, 2023

(30) Foreign Application Priority Data
Jun. 24, 2020 (EP) .................................... 20182077

(51) Int. Cl.
*C12N 9/20* (2006.01)
*A61K 38/46* (2006.01)

(52) U.S. Cl.
CPC ............... *C12N 9/20* (2013.01); *A61K 38/46* (2013.01)

(58) Field of Classification Search
CPC ............. C12N 9/20; A61K 38/46; A61P 1/18
See application file for complete search history.

(56) References Cited

U.S. PATENT DOCUMENTS

2018/0073001 A1* 3/2018 Hartmann ................ A61P 1/18

FOREIGN PATENT DOCUMENTS

| WO | 2000046381 A1 | 8/2000 |
| WO | 2000058483 A2 | 10/2000 |
| WO | 2007006812 A1 | 1/2007 |
| WO | 2016116600 A1 | 7/2016 |

OTHER PUBLICATIONS

Search Result No. 1 (Year: 2018).*
International Search Report for PCT/EP2021/067419, mailed Sep. 22, 2021, pp. 1-4.
Cassidy-Hanley, D. et al., "Germline and somatic transformation of mating Tetrahymena thermophila by particle bombardment," Genetics, 1997, vol. 146(1), pp. 135-147.
Gargouri, Y. et al., "Human gastric lipase: The effect of amphiphiles," Eur J Biochem, 1986, vol. 156(2), pp. 305-310.
Nixon, M. et al., "A simple and sensitive colorimetric method for the determination of long-chain free fatty acids in subcellular organelles," Anal Biochem, 1979, 97(2), pp. 403-409, Abstract Only, pp. 1-2.
Stratagene, "QuikChange(R) Site-Directed Mutagenesis Kit: Instruction Manual," 2007, pp. i-iv, 1-16, available at: http://kirschner.med.harvard.edu/files/protocols/Stratagene_quickchangepdf.pdf.
Loke P, Sim TS., "A comparison of three site-directed mutagenesis kits," Z Naturforsch C., 2001, vol. 56(9-10), pp. 810-813.
Northfield TC et al., "Postprandial concentrations of free and conjugated bile acids down the length of the normal human small intestine," Gut, 1973, vol. 14(7), pp. 513-518.
Koziolek M et al., "Investigation of pH and Temperature Profiles in the GI Tract of Fasted Human Subjects Using the Intellicap System," J Pharm Sci., 2015, vol. 104(9), pp. 2855-2863, Abstract Only, pp. 1-3.
Brock et al., "Novel ciliate lipases for enzyme replacement during exocrine pancreatic insufficiency," Eur J Gastroenterol Hepatol., 2016, vol. 28(II), pp. 1305-1312, Abstract Only, pp. 1-2.
Tondravi MM et al., "Transformation of Tetrahymena thermophila by microinjection of ribosomal RNA genes," Proc. Natl. Acad. Sci. USA, 1986, vol. 83(12), pp. 4369-4373.
Gaertig J et al., "Efficient mass transformation of Tetrahymena thermophila by electroporation of conjugants," Proc. Natl. Acad. Sci. USA, 1992, vol. 89(19), pp. 9196-9200.
Diogo MM et al., "Hydrophobic interaction chromatography of Chromobacterium viscosum lipase on polypropylene glycol immobilised on Sepharose," J Chromatogr A., 1999, vol. 849(2), pp. 413-419, Abstract Only, pp. 1-3.
Weide et al., "A recombinase system facilitates cloning of expression cassettes in the ciliate Tetrahymena thermophila," BMC Microbiology, 2007, vol. 7, pp. 1-11.
Weide et al., "Secretion of functional human enzymes by Tetrahymena thermophila," BMC Biotechnol., 2006, vol. 6, pp. 1-9.

* cited by examiner

Primary Examiner — Ruth A Davis
(74) Attorney, Agent, or Firm — EVENTIDE LAW LLC

(57) ABSTRACT

The present invention relates to a Lipase enzyme comprising an amino acid sequence that has at least 90% sequence identity with SEQ ID NO 1, or comprising a functional fragment thereof encompassing position Q55, with the proviso that the lipase enzyme has a substitution of an amino acid with a basic side chain at neutral pH in position Q55 (FIG. 1).

17 Claims, 7 Drawing Sheets
Specification includes a Sequence Listing.

LIPASE ENZYME

FIELD OF THE INVENTION

The present application relates to a new lipase enzyme.

BACKGROUND OF THE INVENTION

Lipid digestion deficiencies and digestive disorders play an increasingly greater role in the general medical and internal medical practice. Such digestive disorders are in many cases the consequence of a more or less pronounced deficiency in so-called pancreatic enzymes. In a healthy state, these enzymes are synthesized in the pancreas by highly specialized cells, the so-called acinic cells, and secreted by exocytosis through juice glands and the main pancreatic duct into the duodenum. The daily amount of pancreatic secretion is about 2 liters. In addition to fat digesting lipase, the pancreatic secretion also contains enzymes for the digestion of proteins (trypsin, chymotrypsin and carboxypeptidases) and carbohydrates ($\alpha$-amylase). The secretion of pancreatic enzymes is exactly controlled by endogenous control mechanisms by means of hormones, such as gastrin, secretin and pancreozymin. This control system can be disturbed by a large number of causes to result in a reduction of pancreatic enzyme secretion or in a complete subsiding of the exocrine pancreatic function. This in turn causes that the chyme is not digested in the small intestine, and a digestive disorder occurs. This disease of the digestive tract, which is also referred to as exocrine pancreatic insufficiency (EPI), can have different causes. In addition to dyspepsia caused by medicaments, chronic atrophic gastritis and chronic pancreatitis, frequently caused by alcohol consumption, disorders caused by surgery (e.g., Billroth I and II, vagotomy, pancreas resection) and cystic fibrosis are etiologic factors of pancreatic insufficiency. At any rate, chronic digestive disorders are of considerable social-medical and thus economic importance, because the symptoms frequently cause the patients to be nondescript and have a shortened expectation of life.

Pancreatogenic digestive disorders and especially EPI cause a lot of complaints in the patients, such as diarrhea, mass stools, sensations of repletion, upper abdominal complaints, weight loss etc.

Irrespective of the causes and the manifestation of pancreatogenic digestive disorders or EPI to avoid malnutrition related morbidity and mortality, it is pivotal to commence a substitution therapy with enzymes as soon as EPI is diagnosed. This means that the lacking enzymes, predominantly lipase, protease and amylase, must be supplied externally. In the therapy, the enzymes are taken in orally by the patient mostly in the middle of the meal and go through the stomach and arrive in the small intestine, where they perform digestion of the chyme and thus adopt the function of the lacking endogenous pancreatic enzymes.

For treating digestive disorders based on the lacking of pancreatic enzymes often pancreatic enzyme replacement therapy (PERT) based on the substitution/replacement of the leading enzyme lipase and the protease, is used. For PERT a wide variety of enzyme preparations are already on the market. These are partly based on pancreatic enzymes from pigs, such as the preparations COMBIZYM®, FESTAL®, PANKREON®, KREON®, PANZYTRAT®, METEOZYM® OR ENZYM-LEFAX N®. Preparations containing pancreatic enzymes, so called pancreatic enzyme products or PEPs, are mostly obtained from pigs from slaughter, for example, pancreas, of pigs. The final product of the preparation process is pancreatin. PEPs are composed of porcine lipase, amylase, and protease and are used in patients with EPI secondary to cystic fibrosis, chronic pancreatitis, and pancreatectomy.

PEPs from pig origin cannot be employed with patients suffering from digestive disorders who have a pig protein allergy. In addition, pigs are considered a natural reservoir of human-pathogenic influenza viruses and a vast number of viruses from porcine origin, so that contamination of pancreatin with such viruses cannot be ruled out. In other words, pancreatic tissue, which would present slaughter waste, if not further processed, can exhibit a high degree of viral contamination. In consequence based on its natural origin, the pancreatic tissue, pancreatin and PEP also can be contaminated with viruses from porcine origin. It has to be emphasized that the International Conference on Harmonisation of Technical Requirements for Registration of Pharmaceuticals for Human Use (ICH) sets a very high standard in its guideline ICH Topic Q 5 A (R1) and demands as the best reasonable assurance that the product is free of virus contamination. The Center for Drug Evaluation and Research (CDER) of the US FDA already requested intensive risk mitigation strategies for lipase containing PEPs like Creon.

This, because there is a risk for contamination of PEPs with Porcine Parvovirus and Porcine Circovirus as well as significant number of swine viruses that are known human pathogens.

For these reasons, it is desirable to have a better defined, less risk prone lipase enzyme for pancreatic enzyme replacement therapy.

Another issue is that the respective preparations employed must contain a sufficient amount of enzymes. In addition, the enzymes must be provided in an enteric formulation, have a small particle size and be completely bioavailable in the digestive tract.

In fact, the daily doses for patients can become quite substantial. A starting dose is around 50,000 to 75,000 units of lipase with a meal and 25,000 units with a snack.

In order to reduce this burden and increase patient compliance, it is desirable to provide lipases with a higher activity.

Another issue is that oftentimes, the commercially available lipases or PERT products are not specifically adapted to the environmental conditions of the human small intestine, including pH and bile acid concentration and composition. The latter two parameters can vary substantially between humans and, e.g., pigs.

BACKGROUND

It is hence one object of the present invention to provide better treatment options for patients suffering from lipid digestion deficiencies or lipid digestive disorders, like e.g., pancreatic insufficiency (EPI)

It is another object of the present invention to provide an alternative to conventional pancreatic enzyme replacement therapy (PERT).

These and further objects are met with methods and means according to the independent claims of the present invention. The dependent claims are related to specific embodiments.

SUMMARY OF THE INVENTION

The present invention provides modified lipase enzymes. The invention and general advantages of its features will be discussed in detail below.

DETAILED DESCRIPTION OF THE INVENTION

Figure 1:
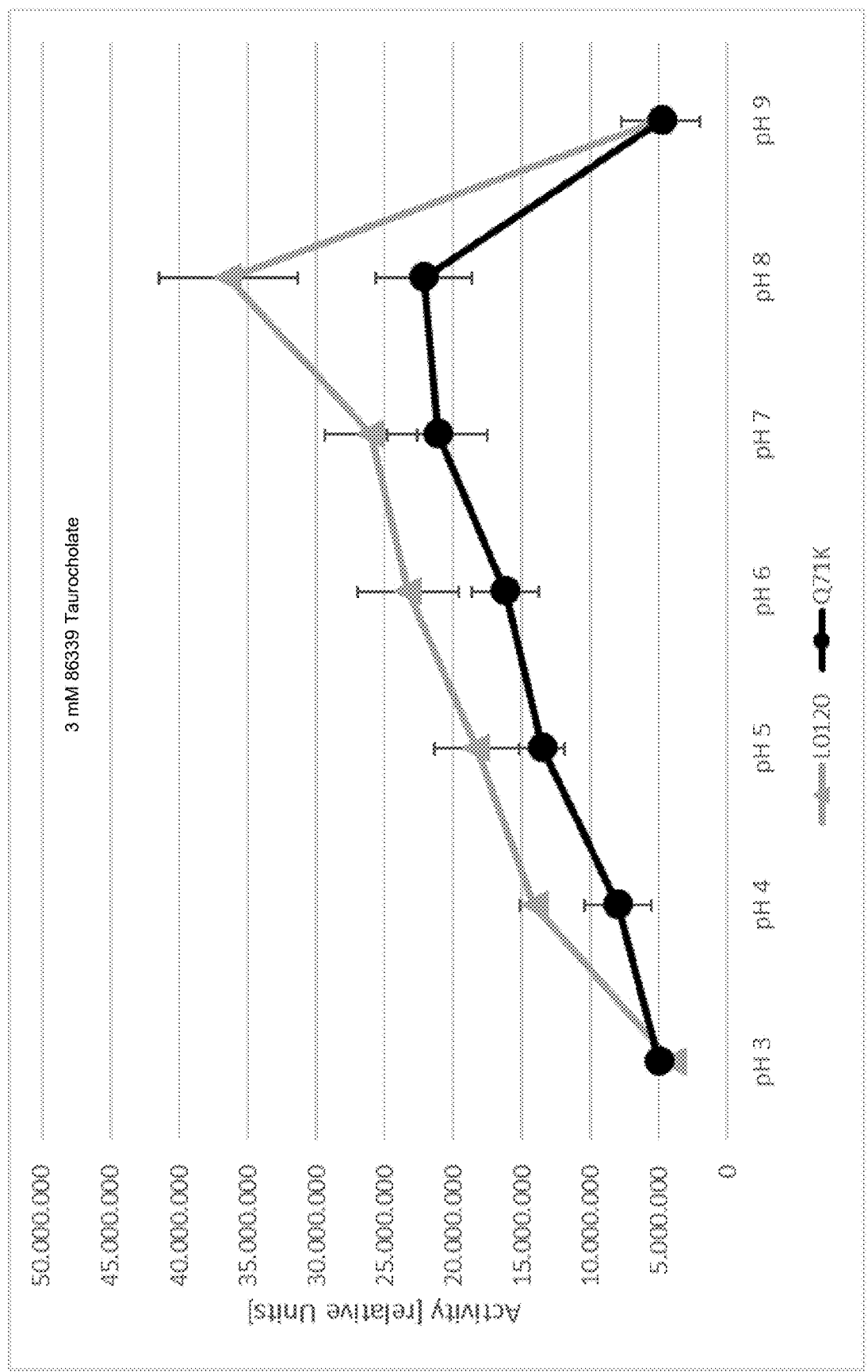
FIG. 1 Comparison of wild-type (WT) and Q55K mutant activity with 3 mM 86339 Taurocholate

Before the invention is described in detail, it is to be understood that this invention is not limited to the particular component parts of the devices described or process steps of the methods described as such devices and methods may vary. It is also to be understood that the terminology used herein is for purposes of describing particular embodiments only, and is not intended to be limiting. It must be noted that, as used in the specification and the appended claims, the singular forms "a", "an", and "the" include singular and/or plural referents unless the context clearly dictates otherwise. It is moreover to be understood that, in case parameter ranges are given which are delimited by numeric values, the ranges are deemed to include these limitation values.

It is further to be understood that embodiments disclosed herein are not meant to be understood as individual embodiments which would not relate to one another. Features discussed with one embodiment are meant to be disclosed also in connection with other embodiments shown herein. If, in one case, a specific feature is not disclosed with one embodiment, but with another, the skilled person would understand that does not necessarily mean that said feature is not meant to be disclosed with said other embodiment. The skilled person would understand that it is the gist of this application to disclose said feature also for the other embodiment, but that just for purposes of clarity and to keep the specification in a manageable volume this has not been done.

Furthermore, the content of the prior art documents referred to herein is incorporated by reference. This refers, particularly, for prior art documents that disclose standard or routine methods. In that case, the incorporation by reference has mainly the purpose to provide sufficient enabling disclosure, and avoid lengthy repetitions.

According to a first aspect of the invention, a lipase enzyme comprising an amino acid sequence that has at least 90% sequence identity with SEQ ID NO 1 is provided, with the proviso that the lipase enzyme has a substitution of an amino acid with a basic side chain at neutral pH in position Q55.

It is to be understood that in the lipase sequence according to SEQ ID NO 1, the signal peptide (=lead peptide) is missing. One suitable signal peptide is disclosed as SEQ ID NO 9, having a length of 16 amino acid residues.

All amino acid positions referred to in this application relate to the counting in SEQ ID NO 1. However, in case a lipase has an N-terminal signal peptide (=lead peptide) like the one in SEQ ID NO 9, the counting needs to take into consideration the additional N-terminal amino acid residues of the signal peptide.

As used herein, the term "amino acid with a basic side chain at neutral pH" encompasses amino acid that e.g. have, in the side chain, an NH group carrying a positive charge at neutral pH.

In one embodiment, such substitution is by an amino acid selected from the group consisting of Lysine (K), Arginine (R) and Histidine (H).

Alternatively, the lipase enzyme comprises a functional fragment of SEQ ID NO 1, or of a sequence that has at least 90% sequence identity with SEQ ID NO 1, which fragment encompasses position Q55, and has the described substitution.

Such fragment could for example have AA residues 21-256 of SEQ ID NO 1, or of a sequence that has at least 90% sequence identity with SEQ ID NO 1, factoring in the substitution in Q55.

The term "functional" implies that such fragment retains lipase activity, in particular under the pH- and bile salt conditions set forth herein.

Said fragment can preferably have a minimum length of ≥100 amino acid residues (AAs); more preferably ≥110 AAs; ≥120 AAs; ≥130 AAs; ≥140 AAs; ≥150 AAs; ≥160 AAs; ≥170 AAs; ≥180 AAs; ≥190 AAs; ≥200 AAs; ≥210 AAs; ≥220 AAs; ≥230 AAs; ≥240 AAs; ≥250 AAs; ≥260 AAs; ≥270 AAs; and most preferably ≥280 AAs.

Said fragment can preferably have a maximum length of ≤280AAs; more preferably ≤270AAs; ≤260AAs; ≤250AAs; ≤240AAs; ≤230AAs; ≤220AAs; ≤210AAs; ≤200AAs; ≤190AAs; ≤180AAs; ≤170AAs; ≤160AAs; ≤150AAs; ≤140AAs; ≤130AAs; ≤120AAs; ≤110AAs; and most preferably ≤100AAs.

SEQ ID NO 1 is the amino acid sequence of a lipase of the ciliate *Tetrahymena thermophila*, called TTHERM_00320120 (UniProtKB—Q237S4 (Q237S4_TETTS). Its use in the treatment of pancreatic insufficiency has been discussed in Brock et al, 2016.

The inventors have shown that, surprisingly, the claimed lipase enzyme has an increased lipolytic activity compared to the lipase enzyme that has the amino acid sequence of SEQ ID NO 1, in a medium having a pH of ≥5.5, in a medium having a bile salt concentration of ≥2.5 mM, and/or in a medium comprising a mixture of two or more different bile acids.

These conditions reflect the in vivo situation in the human small intestine.

The terms bile salt and bile acid are used interchangeably herein. Bile acids are steroid acids found predominantly in the bile of mammals. In humans, taurocholic acid and glycocholic acid (derivatives of cholic acid) and taurochenodeoxycholic acid and glycochenodeoxycholic acid (derivatives of chenodeoxycholic acid) are the major bile salts in bile and are roughly equal in concentration. The conjugated salts of their 7-alpha-dehydroxylated derivatives, deoxycholic acid and lithocholic acid, are also found, with derivatives of cholic, chenodeoxycholic and deoxycholic acids accounting for over 90% of human biliary bile acids. Bile acids make about 80% of the organic compounds in bile. The main function of bile acids is to allow digestion of dietary fats and oils by acting as a surfactant that emulsifies them into micelles, with the hydrophobic sides towards the fat and hydrophilic sides facing outwards. The hydrophilic sides are negatively charged, and this charge prevents fat droplets coated with bile from re-aggregating into larger fat particles. Ordinarily, the micelles in the duodenum have a diameter around 14-33 μm.

The dispersion of food fat into micelles provides a greatly increased surface area for the activity of the pancreatic lipases, which actually digest the triglycerides, and is able to reach the fatty core through gaps between the bile salts.

In some embodiments, the lipase according to the invention has ≥91%, ≥92%, ≥93%, ≥94%, ≥95%, ≥96%, ≥97%, ≥98 or most preferably ≥99% sequence identity with SEQ ID NO 1, with the proviso that the lipase enzyme has the substitution at position Q55.

In some embodiments, the lipase according to the invention has ≥91%, ≥92%, ≥93%, ≥94%, ≥95%, ≥96%, ≥97%, ≥98 or most preferably ≥99% sequence identity with any one of SEQ ID NO 3 ("Q55K"), SEQ ID NO 4 ("Q55R"), or SEQ ID NO 5 ("Q55H").

In some embodiments, the lipase according to the invention is identical to SEQ ID NO 1, except that the lipase enzyme has the substitution at position Q55. Thus, in some embodiments the lipase is identical to SEQ ID NO 1, except that the lipase enzyme has the substitution Q55K (SEQ ID NO 3). In some embodiments the lipase is identical to SEQ ID NO 1, except that the lipase enzyme has the substitution Q55R (SEQ ID NO 4). In some embodiments the lipase is identical to SEQ ID NO 1, except that the lipase enzyme has the substitution Q55H (SEQ ID NO 5).

The said substitution at position Q55 substitutes Glutamine (Q), which is an aliphatic, neutrally charged amino acid with Lysine (K), Arginine (R) or Histidine (H), all of which carry a positive net charge.

Generally, many lipases have, in their active center, a catalytic triad comprising aspartic acid, histidine and serine. The aspartic acid extracts a proton from histidine and activates it. In response, the catalytically active histidine recruits a proton from the serine, which in turn increases the nucleophilicity of the serine residue. The latter can now attack the carbonyl carbon of a substrate ester located in the active center, said ester forming part of the enzymes fatty substrate.

The inventors have shown that position Q55 is only 15 Å from the serine residue in the catalytic triad. Without being bound to theory, substitution of the neutral Q55 by a positive amino acid residue could actually be causative for the observed increase in activity.

In one embodiment, the lipase according to the invention, next to having at least 90% sequence identity with SEQ ID NO 1, or being a fragment thereof as described elsewhere herein, and having the Q55 substitution, retains the catalytic triad comprising aspartic acid (D), histidine (H) and serine (S). In one embodiment, the catalytic triad comprises the following amino acid residues according to SEQ ID NO 1: S140, D199 and H256.

In one embodiment, the lipase according to the invention, next to having at least 90% sequence identity with SEQ ID NO 1, or being a fragment thereof as described elsewhere herein, and having the Q55 substitution, and optionally next to the conservation of the catalytic triad as described elsewhere herein, retains the oxyanion pocket that stabilized the intermediary product. Said pocket is mainly formed by the following amino acid residues according to SEQ ID NO 1: Tyr 21 and Thr 76 (plus optionally S140 and H256).

Other lipases having at least 90% sequence identity with SEQ ID NO 1 are the lipases according to SEQ ID Nos 10-12 (having the Q55K mutation), SEQ ID Nos 13-15 (having the Q55R mutation), and SEQ ID Nos 16-18 (having the Q55H mutation).

"Percentage of sequence identity" is determined by comparing two optimally aligned sequences over a comparison window, wherein the portion of the polynucleotide sequence in the comparison window may comprise additions or deletions (i.e., gaps) as compared to the reference sequence (e.g., a polypeptide), which does not comprise additions or deletions, for optimal alignment of the two sequences. The percentage is calculated by determining the number of positions at which the identical nucleic acid base or amino acid residue occurs in both sequences to yield the number of matched positions, dividing the number of matched positions by the total number of positions in the window of comparison and multiplying the result by 100 to yield the percentage of sequence identity.

The terms "identical" or percent "identity," in the context of two or more nucleic acids or polypeptide sequences, refer to two or more sequences or subsequences that are the same sequences. Two sequences are "substantially identical" if two sequences have a specified percentage of amino acid residues or nucleotides that are the same (i.e., at least 85%, 90%, 95%, 96%, 97%, 98% or 99% sequence identity over a specified region, or, when not specified, over the entire sequence of a reference sequence), when compared and aligned for maximum correspondence over a comparison window, or designated region as measured using one of the following sequence comparison algorithms or by manual alignment and visual inspection.

One suitable algorithm to determine sequence identities is the BLAST algorithm. Another algorithm to determine sequence identities is the Clustal Omega algorithm.

The disclosure provides polypeptides or polynucleotides that are substantially identical to the polypeptides or polynucleotides, respectively, exemplified herein. Optionally, the identity exists over a region that is at least about 15, 25 or 50 nucleotides in length, or more preferably over a region that is 100 to 500 or 1000 or more nucleotides in length, or over the full length of the reference sequence. With respect to amino acid sequences, identity or substantial identity can exist over a region that is at least 5, 10, 15 or 20 amino acids in length, optionally at least about 25, 30, 35, 40, 50, 75 or 100 amino acids in length, optionally at least about 150, 200 or 250 amino acids in length, or over the full length of the reference sequence. With respect to shorter amino acid sequences, e.g., amino acid sequences of 20 or fewer amino acids, substantial identity exists when one or two amino acid residues are conservatively substituted, according to the conservative substitutions defined herein.

According to one embodiment, the lipase enzyme has the substitution Q55K.

According to one other embodiment, the lipase enzyme has a lipolytic activity of at least 30.000 U/g.

In the context of the present disclosure, the terms "lipase activity" and "lipolytic activity" are used interchangeably. For the determination of the lipase activity (lipolytic activity) a modified version of the colorimetric assay from Nixon and Chan (1979) can be used as discussed elsewhere herein.

According to one other embodiment, the lipase enzyme comprises at least one conservative amino acid substitution further to the substitution in position Q55, compared to the amino acid according to SEQ ID NO 1.

In this context, a "conservative amino acid substitution", has a smaller effect on lipase function than a non-conservative substitution. Although there are many ways to classify amino acids, they are often sorted into six main groups on the basis of their structure and the general chemical characteristics of their R groups.

In some embodiments, a "conservative amino acid substitution" is one in which the amino acid residue is replaced with an amino acid residue having a similar side chain. For example, families of amino acid residues having similar side chains have been defined in the art. These families include amino acids with basic side chains (e.g., lysine, arginine, histidine),
acidic side chains (e.g., aspartic acid, glutamic acid),
uncharged polar side chains (e.g., glycine, asparagine, glutamine, serine, threonine, tyrosine, cysteine),
nonpolar side chains (e.g., alanine, valine, leucine, isoleucine, proline, phenylalanine, methionine, tryptophan), beta-branched side chains (e.g., threonine, valine, isoleucine) and
aromatic side chains (e.g., tyrosine, phenylalanine, tryptophan, histidine).

Other conserved amino acid substitutions can also occur across amino acid side chain families, such as when substituting an asparagine for aspartic acid in order to modify the charge of a peptide. Conservative changes can further include substitution of chemically homologous non-natural amino acids (i.e. a synthetic non-natural hydrophobic amino acid in place of leucine, a synthetic non-natural aromatic amino acid in place of tryptophan).

SEQ ID Nos 6-8 show variants of the wildtype sequence that have two conservative amino acid substitutions, namely V70I/V152I; V71I/L207I or V119I/Y168F, respectively. The mutation in Q55 as set forth herein can also be accomplished in these wildtype variants.

According to one other embodiment, the lipase enzyme has an increased lipolytic activity in a medium having a pH of ≥5.5, compared to the lipase enzyme that has the amino acid sequence of SEQ ID NO 1.

In one embodiment, such increased lipolytic activity is present at a pH of between ≥5.5 and ≤11, between ≥6 and ≤10, or between ≥6.5 and ≤9, compared to the lipase enzyme that has the amino acid sequence of SEQ ID NO 1.

According to one other embodiment, the lipase enzyme has an increased lipolytic activity in a medium having a total bile salt concentration of ≥2.5 mM, compared to the lipase enzyme that has the amino acid sequence of SEQ ID NO 1.

In one embodiment, such increased lipolytic activity is present in a medium having a total bile salt concentration of between ≥2.5 mM and ≤15 mM, compared to the lipase enzyme that has the amino acid sequence of SEQ ID NO 1.

In different embodiments, the bile salt is selected from the group consisting of Cholic acid, Glycocholic acid, Taurocholic acid, Deoxycholic acid, Chenodeoxycholic acid, Glycochenodeoxycholic acid, Taurochenodeoxycholic acid, and Lithocholic acid According to one other embodiment, the lipase enzyme has an increased lipolytic activity in a medium comprising a mixture of two or more different bile salts, compared to the lipase enzyme that has the amino acid sequence of SEQ ID NO 1.

In different embodiment, the two or more different bile salts are selected from the group consisting of Cholic acid, Glycocholic acid, Taurocholic acid, Deoxycholic acid, Chenodeoxycholic acid, Glycochenodeoxycholic acid, Taurochenodeoxycholic acid, and Lithocholic acid In either of the three cases, the activity can be increased by ≥5%, ≥10%, ≥15%, ≥20%, ≥25%, ≥30%, ≥40%, ≥50%, ≥60%, ≥70%, ≥80%, ≥90%, ≥100%, ≥150%, or even ≥200%. For the determination of the lipase activity (lipolytic activity) a modified version of the colorimetric assay from Nixon and Chan (1979) can be used as discussed elsewhere herein.

According to one other aspect of the invention, a nucleic acid is provided that encodes for a lipase enzyme according to any one of the aforementioned embodiments. Such nucleic acid can for example be an mRNA or a cDNA. Also provided is a suitable vector comprising such nucleic acid.

According to one other embodiment use of the lipase enzyme according to the above description (for the manufacture of a medicament) is provided in the treatment of a human or animal subject
being diagnosed for,
suffering from or
being at risk of developing
a lipid digestion deficiency, a digestive disorder, and/or an inflammatory condition, or for the prevention of such condition.

According to one embodiment, the digestive disorder is exocrine pancreatic insufficiency. Such exocrine pancreatic insufficiency can be caused, inter alia, by cystic fibrosis, blockage of the pancreatic duct, or pancreatectomy.

According to one other embodiment, the inflammatory condition is chronic inflammation of the pancreas (pancreatitis) or inflammatory bowel disease According to one other aspect of the invention, a pharmaceutical composition comprising the lipase enzyme according to the above description and optionally one or more pharmaceutically acceptable excipients is provided.

According to one other aspect of the invention, a combination comprising (i) the lipase enzyme or the pharmaceutical composition according to the above description and (ii) one or more therapeutically active compounds is provided.

According to one other aspect of the invention, a method for treating or preventing a lipid digestion deficiency, a digestive disorder, and/or an inflammatory condition is provided, which method comprises administration, to a human or animal subject, of (i) the lipase enzyme, (ii) the pharmaceutical composition, or (iii) the combination according to the above description, in a therapeutically sufficient dose.

According to one other aspect of the invention, a therapeutic kit of parts is provided comprising:
a) (i) the lipase enzyme, (ii) the pharmaceutical composition, or (iii) the combination according to the above description,
b) an apparatus for administering the composition, composition or combination, and
c) instructions for use.

Such apparatus is for example a capsule, pill, injector, inhalator or the like.

According to one other aspect of the invention, a method of producing a lipase enzyme is provided, which method comprises the steps of
a) expressing the lipase enzyme in an expression host from the order ciliates, and
b) purifying the lipase enzyme expressed in step a).

According to one embodiment, the method comprises, before step a), the step of transforming the ciliate with a vector encoding for said lipase enzyme. Suitable vectors are disclosed elsewhere herein.

Methods for the transformation of ciliates, which can be used in the context of the present invention, comprise, among others, microinjection, electroporation and particle bombardment, and are, for example, described in Tondravi & Yao (1986), Gaertig & Gorovsky (1992) and Cassidy-Hanley et al (1997).

Methods for transformation and heterologous protein expression have been described for a few protists (WO 00/58483 and WO 00/46381). The generation of mitotically stable transformants of the ciliate *Tetrahymena thermophila* can be achieved after transfection either of the somatic macronucleus or the generative micronucleus by microinjection, electroporation or by particle bombardment.

Selection of the transformants can be performed using different selection markers like the neomycin resistance (Weide et al. 2006, BMC) and the integration of the heterologous genes by homologous DNA recombination, which results in stable thymidin-auxotrophic *Tetrahymena* cells (Weide et al. 2006, BMC). In addition, the use of blasticidin S (Weide et al. 2007, BMC) or paclitaxcel (WO 00/46381) resistance has also been considered.

Promoters suitable for lipase expression in ciliates are, for example, disclosed in US2008261290A1 which is also registered for the applicant of the present invention, the content of which shall be incorporated herewith by reference. Therein, a heat-inducible promoter and a metallothionein-promoter are disclosed which can also be used for the purposes of the present invention.

According to one further embodiment, the expression host is from the genus *Tetrahymena* According to one further embodiment, the expression host is *Tetrahymena thermophila*.

EXAMPLES

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

All amino acid sequences disclosed herein are shown from N-terminus to C-terminus; all nucleic acid sequences disclosed herein are shown 5'->3'.

Materials and Methods

Media:

| LB (Lysogeny Broth) medium | |
|---|---|
| 10 g/L | casein peptone |
| 5 g/L | yeast extract |
| 5 g/L | g/L NaCl |
| | In distilled water, pH 7.5 |

| LB agar plates | |
|---|---|
| 15 g/L | Agar-agar |
| | In LB medium |
| | optional 25 µg/mL kanamycin |
| | or 100 µg/mL ampicillin |

| Cre-Lox - LB agar plates | |
|---|---|
| 7% (w/v) | Sucrose |
| 30 µg/mL | Chloramphenicol |
| 100 µg/mL | Ampicillin |
| 86% (v/v) | LB with 15 g/L agar |

| Super Optimal Broth (SOC) medium, Invitrogen GmbH, Germany, Karlsruhe | |
|---|---|
| Dryls (1x) | |
| 1.5 mM | Trinatriumcitrat-Dihydrat |
| 1 mM | NaH2PO4-Monohydrat |
| 1 mM | Na2HPO4 |
| 1.5 mM | CaCl2 |

| MW 1010 | |
|---|---|
| 10 g/L | malt extract |
| 10 g/L | Wheat peptone E1 |
| 5 g/L | yeast extract |
| 2 g/L | glucose monohydrate |
| 1 mL/L | ferrous-sulphate/chelate solution |

| MW 1515 | |
|---|---|
| 15 g/L | malt extract |
| 15 g/L | Wheat peptone E1 |
| 5 g/L | yeast extract |
| 2 g/L | glucose monohydrate |
| 1 mL/L | ferrous-sulphate/chelate solution |
| Paromomycin concentration for Fermentation: | |
| 224 µg/ml Paromomycin | |
| Paromomycin concentration for adaption of mutants: | |
| 196 µg/ml Paromomycin | |

Buffers

As buffers the typical buffers used in hydrophobic interaction chromatography are being applied, as e.g. disclosed in Djogo et al 1999, the content of which is incorporated by reference herein.

Machines and Columns

| Equipment | Designation | Supplier |
|---|---|---|
| Äkta Pure and Fraction collector F9-C | Chromatography system | GE Healthcare D-A-CH, Munich, Germany |
| Biolistic gun | PDS-1000/He Biolistic ® Particle Delivery System | BioRad Laboratories GMBH Hercules-California, USA |
| BioSpectrometer kinetic | Absorption measurement | Eppendorf AG, Hamburg, Germany |
| Capto Octyl | HIC Column | GE Healthcare D-A-CH, Munich, Germany |
| Fusion Solo | Fluorescent measurement | Vilber Lourmat Deutschland GmbH, Eberhardzell, Germany |
| Mini Protean Tetracell | Electrophoresis Chamber | BioRad Laboratories GMBH Hercules-California, USA |
| Multiforce HAT | 1 l Bioreactor | Infors HT, Bottmingen-Basel Switzerland |
| Superdex Increase 10/300 GL | SEC Column | GE Healthcare D-A-CH, Munich, Germany |
| ThermoMixer | Tempering and mixing samples | Eppendorf AG, Hamburg, Germany |

1. Mutation of Expression Vectors

Figure 6:
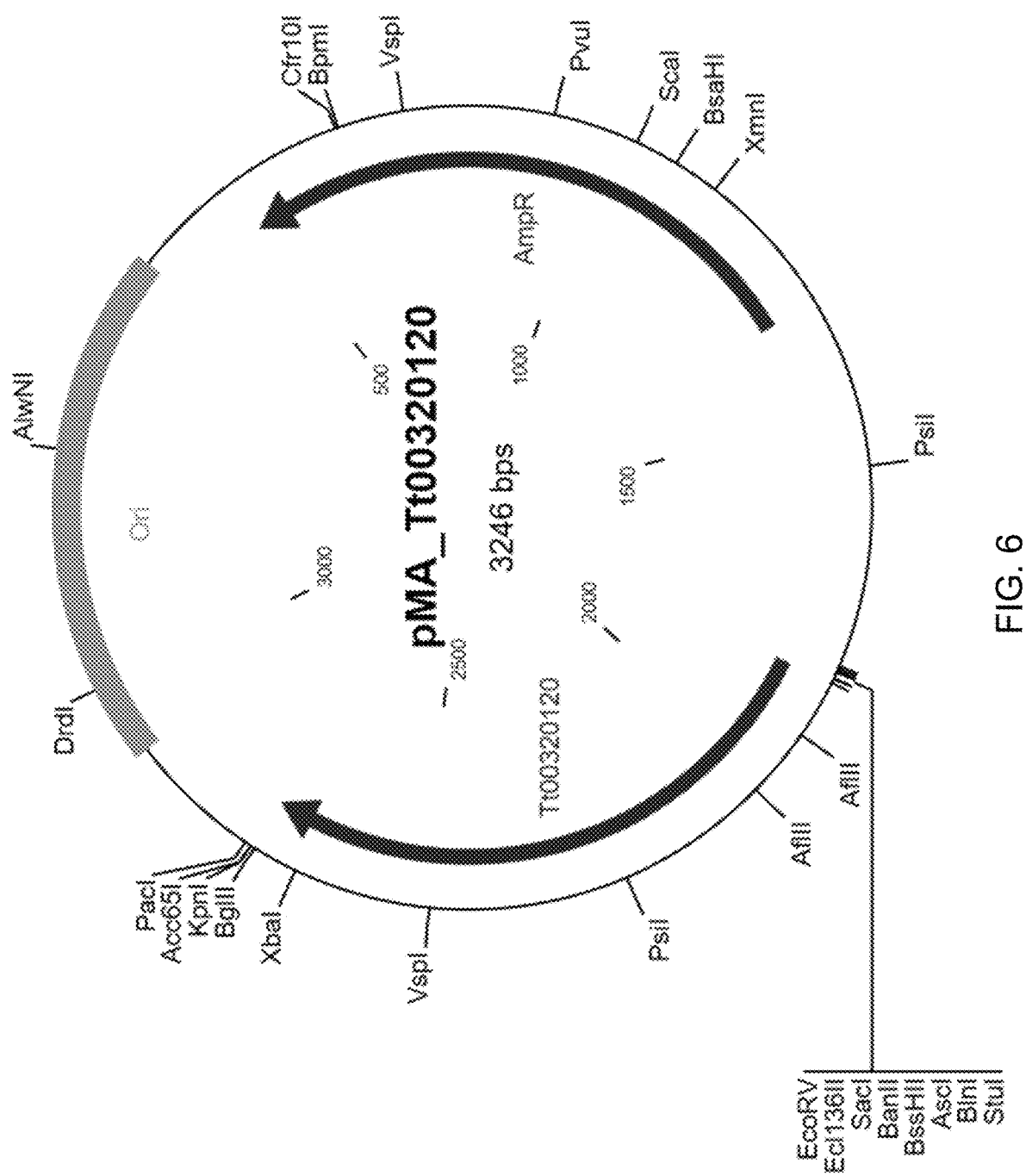
FIG. 6: Vector map of the used pMA vector, showing the target gene (Tt00320120), origin of Replication (Ori), Ampicilin resistance (AmpR) and different restriction sides (PsiI, etc.). The pMA emerged from the pMX system.
Figure 7:
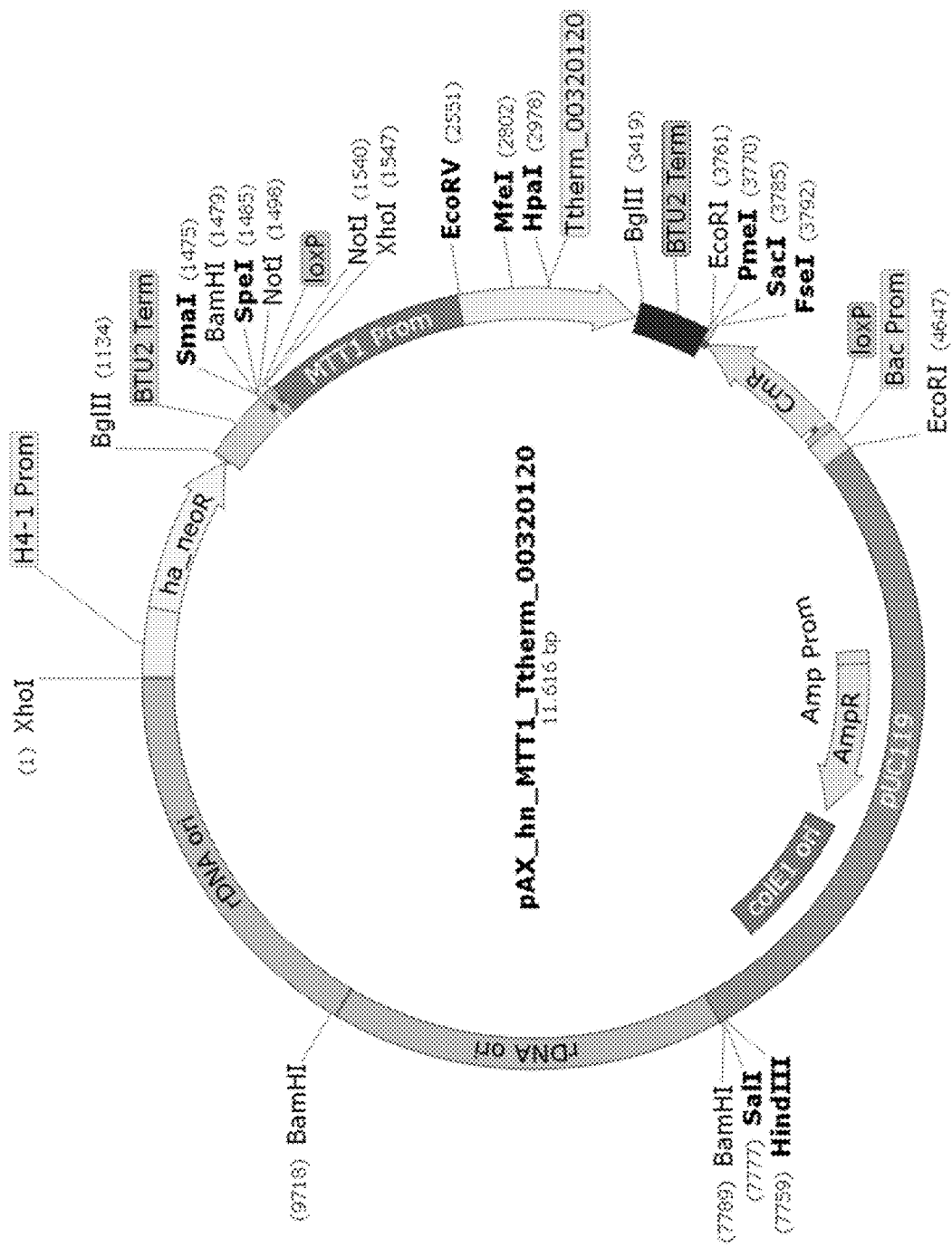
FIG. 7: Vector map of the used pAX vector showing the expression cassette (promoter: MTT1, target gene: Ttherm_00320120, terminator: BTU2), three resistances: Chloramphenicol (CmR), Ampicillin (AmpR), a codon harmonized Paromomycin-resistance sequence (ha_NeoR), two Cre/loxP-sides (loxP), three origins of replications (colE1: *E. coli*, rDNA ori: *T. thermophila*) and different restriction sides (EcoRV, etc.). The backbone is a pUC119 vector.

The MTT1_TTHERM_00320120 gene (UniProtKB—Q237S4, the amino acid of which shown herein as SEQ ID NO 1) inside the pAM vector were used for mutagenesis, based on the QuikChange method (QUIKCHANGE™ Site-Directed Mutagenesis Kit From Stratagene, Catalog #200518, described by Loke et al. 2001). Two primers with point mutations were produced to create the amino acid substitutions. After mutating the gene inside the pMA vector, the gene was ligated inside the pDL_S2 vector and afterwards inserted in the shuttle-vector pAX_ha_neo using a Cre dependent recombinase system. See FIGS. 6 and 7 for the respective vectors.

2. Cultivation of *Tetrahymena* and Transformation of Expression Plasmids (Biolistic Bombardment)

For this experiment the *Tetrahymena thermophila* strains 1868/4 and 1868/7 were used for the transformation, which was performed as previously described in Cassidy-Hanley et al. (1997). The cultivation took place in a 1 l bioreactor over 50 h in MW1515 medium (15 g/l malt extract, 15 g/l wheat peptone E1, 5 g/l yeast extract, 1 ml/l ferrous-sulphate/chelate solution, 2 g/l glucose monohydrate). The expression by the MTT1 promotor was induced by the addition of 10 µg/ml final concentration CdCl2 in the mid log phase, around 24 h after inoculation. The correct expression was tested by Coomassie stained SDS-Pages and a WB using a polyclonal antibody.

3. Purification

For the determination of the specific activity in several measurements the lipase was purified gradually by multiple steps. The supernatant was concentrated, and the buffer was exchanged by diafiltration. After a 20× concentration the sample was diluted by phosphate buffer to bind at a Hydrophobic interaction chromatography (HIC) column. The elution took place in one step, after washing the column, gradually by decreasing the Ammonium Sulfate concentration to 0%.

The eluted Protein was collected and used for the further purification on a Superdex75 Increase 10/300 GL size exclusion chromatography (SEC) column.

4. Determination of Lipase Activity

For the determination of the lipase activity (lipolytic activity) a modified version of the colorimetric assay from Nixon and Chan (1979) was used as described in Brock et al 2016, the content of which is incorporated by reference herein. For the experiment different bile acids and a defined bile saltmixture were tested: Taurocholate (3 mM) for the standard and for the samples as well, 7.5 mM Taurocholate (BRP) and a mixed bile salts solution (IVIES), described by Gargouri et al. (1986), only for the samples. The pH was adjusted by a phosphate buffer, 54 mM and pH 6-7.5, containing 140 mM NaCl final concentration.

Example 1

FIG. 1 Comparison of wild-type (WT) and Q55K mutant activity with 3 mM 86339 Taurocholate For the initially used Sigma 3 mM Taurocholate 86339 which is 97% pure, the by WB-Quantification normalized volume activity of the WT-0120 Lipase differs only from the Q55K-Mutant Lipase by a higher activity from pH 4 to pH 8. The concentration of the taurocholate does not reach the critical micellar concentration (CMC) and does not start to inhibit the activity at basic pH.

Figure 2:
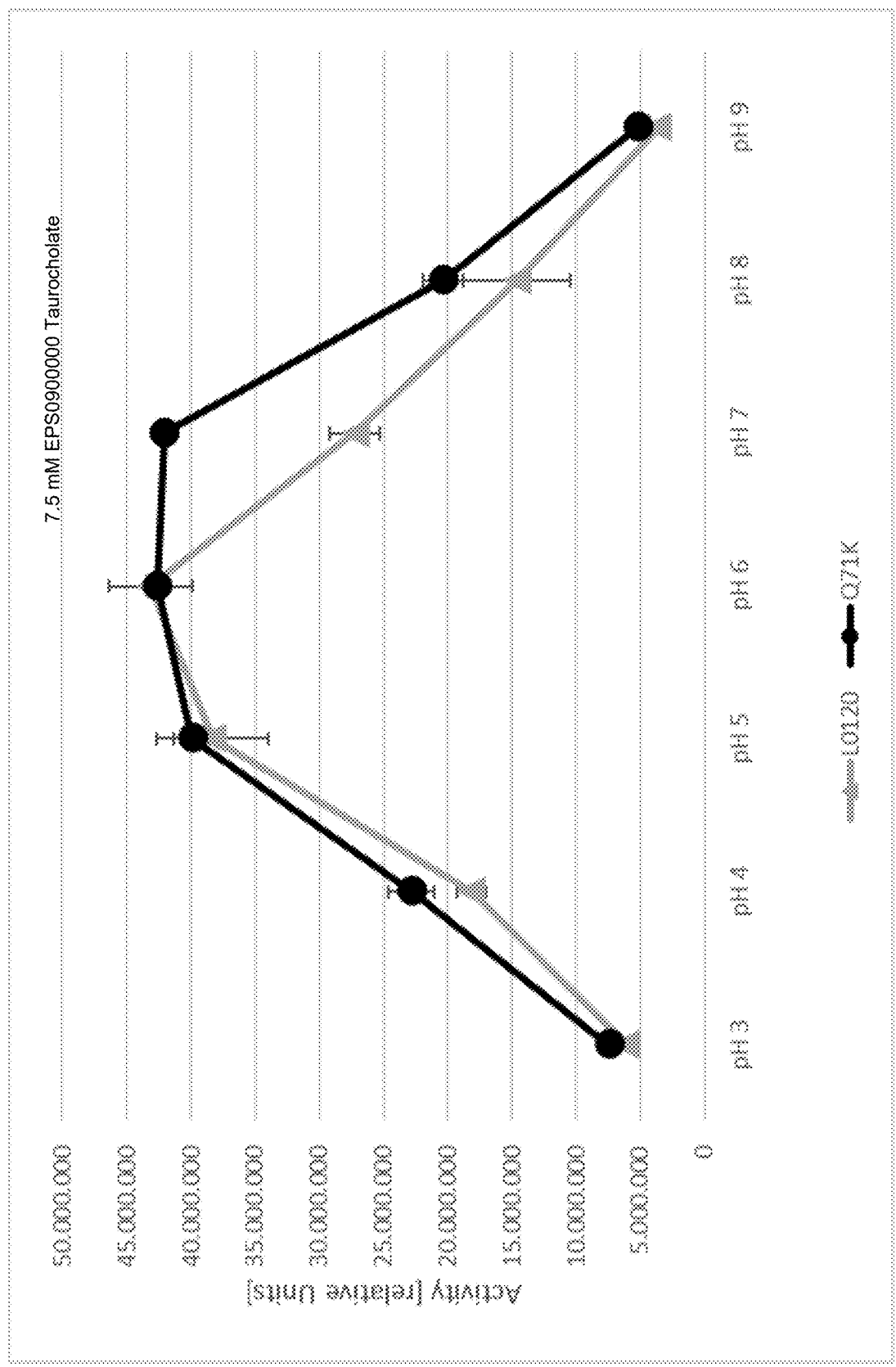
FIG. 2: Comparison of WT and Q55K mutant activity with 7.5 mM EPS0900000 Taurocholate.

FIG. 2: Comparison of WT and Q55K mutant activity with 7.5 mM EPS0900000 Taurocholate.

The other Taurocholate, preferred from the *European pharmacopeia*, EPS0900000 BRP (from LGC), with no existing certificate of pureness and a brownish color, leads to a completely different distribution of the activity over pH value. Using the concentration of 7.5 mM, both Lipases, WT and the Q55K lipase, show a very similar activity until pH 6, but afterwards the WT activity collapses, whereas the Q55K activity is able to maintain the level from pH 6 and stays higher over pH 7 and pH 8, than the WT.

Without being bound to theory, this effect seems to be based on impurities in the second Taurocholate, which means precisely the existence of other bile acids, with much lower CMC as Taurocholate. These bile acids are obviously able to inhibit the activity of the WT lipase at basic pH values.

In fact, a medium comprising a mixture of bile acids reflects the in vivo situation much better than a medium comprising only pure Taurocholate.

Figure 3:
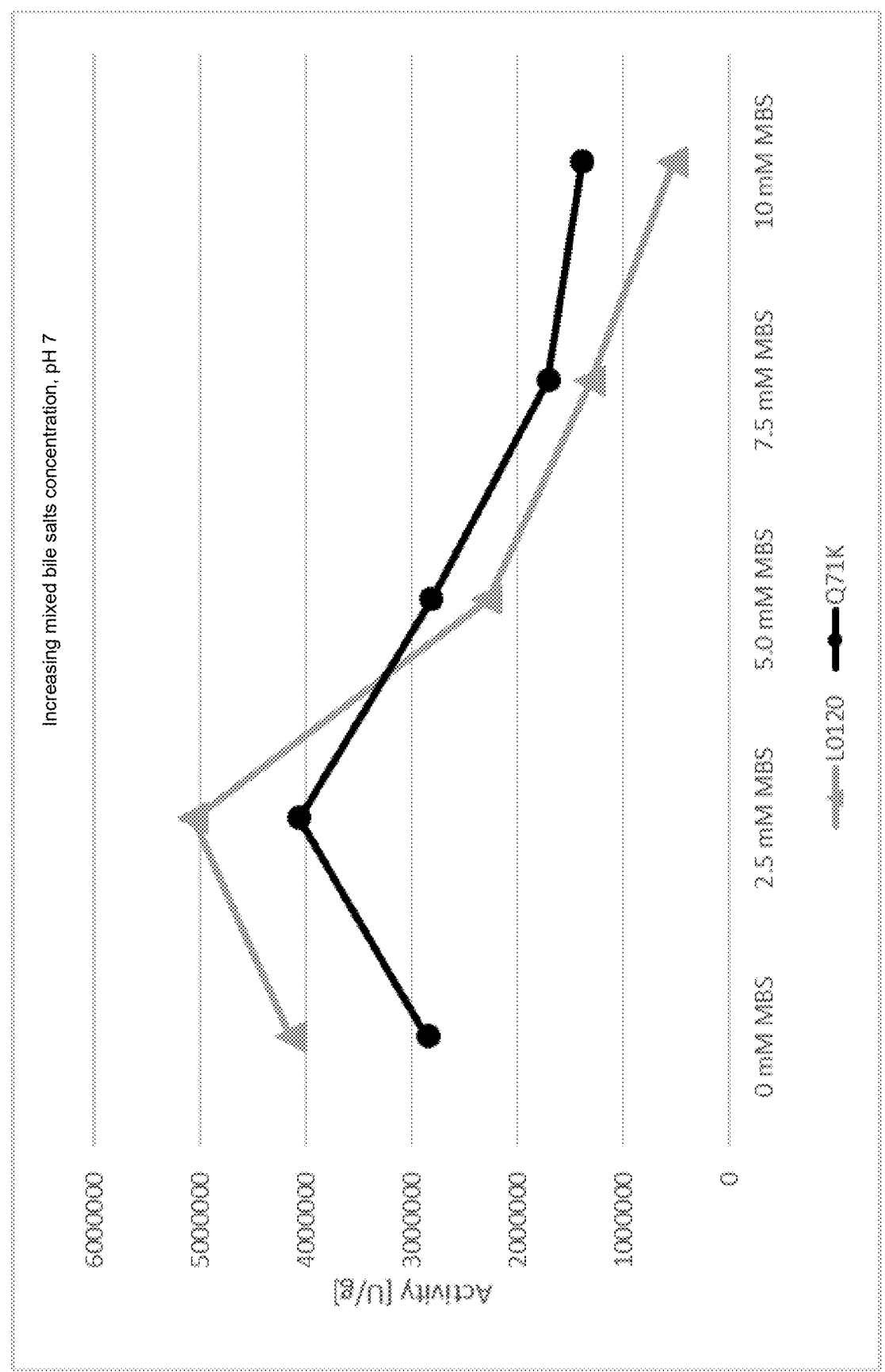
FIG. 3: Alteration of the specific lipase activity of the purified WT- and Q55K mutant lipase by increasing mixed bile salts concentration and 140 mM NaCl

FIG. 3: Alteration of the specific lipase activity of the purified WT- and Q55K mutant lipase by increasing mixed bile salts concentration and 140 mM NaCl The analysis of the purified WT and Q55K Lipase with different MBS concentrations, which are closer to the in vivo conditions, shows a strong effect at pH 7. The specific activity first increases, for both Lipases, correlating with the MBS concentration, whereby the WT-Lipase already is starting with a higher activity. Only after reaching an MBS concentration between 2.5 and 5.0 mM the activity of the Q55K Lipase excels the WT-Activity, demonstrating the higher tolerance of the Q55K mutation against high bile salt concentration in neutral to basic pH.

Figure 4:
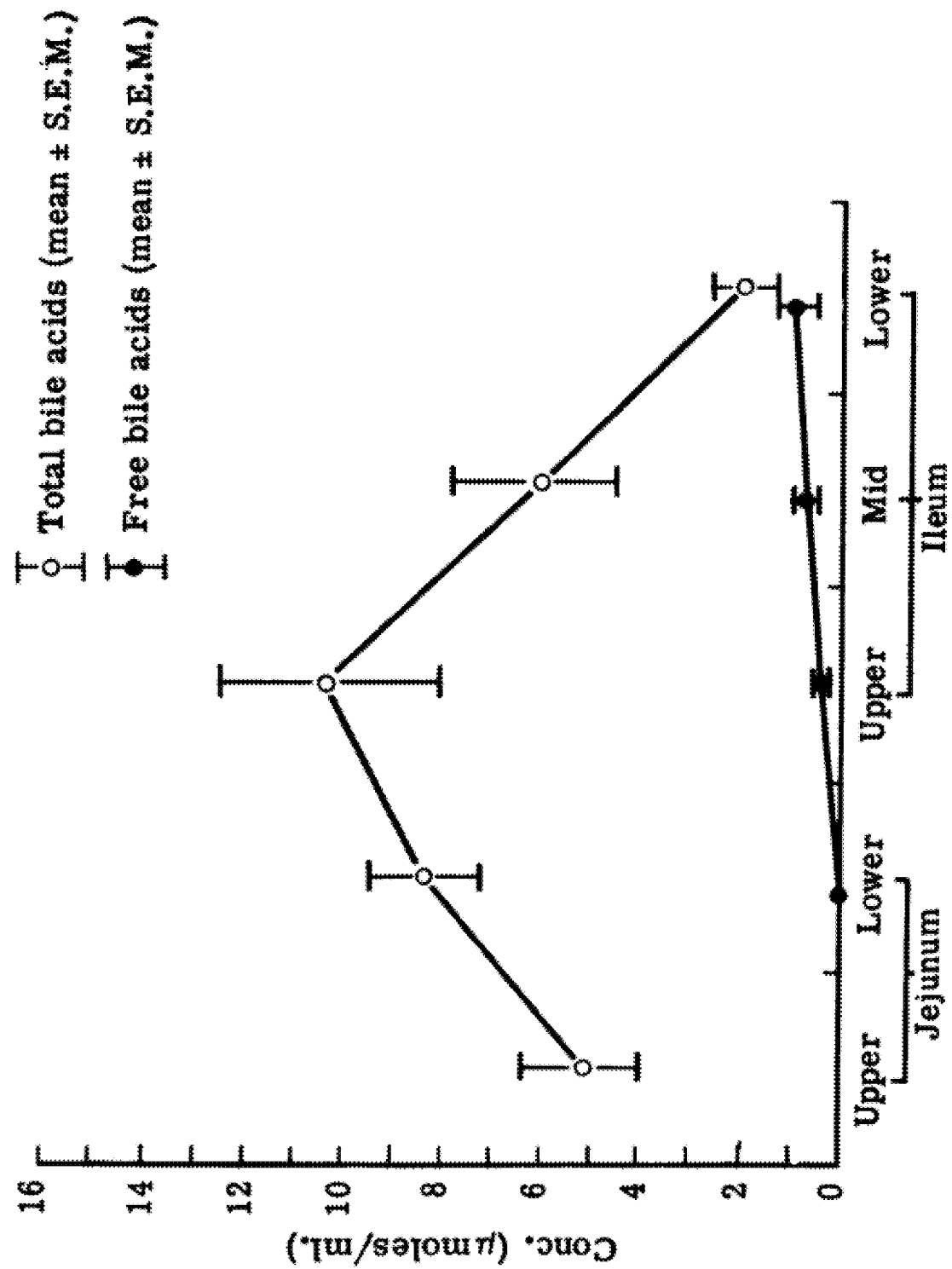
FIG. 4: Bile salt concentration in the human small intestine. Taken from Northfield et. McColl, 1973. In all section with the exception of the lower ileum, the total bile acid concentration is ≥4 μMimi (equals ≥4 mM).

FIG. 4: Bile salt concentration in the human small intestine. Taken from Northfield et. McColl, 1973. In all section with the exception of the lower ileum, the total bile salt concentration is ≥4 µMimi (equals ≥4 mM).

This means that the Lipase according to the invention exhibits higher activity in comparison to the WT Lipase under conditions which reflect the in vivo situation.

Figure 5:
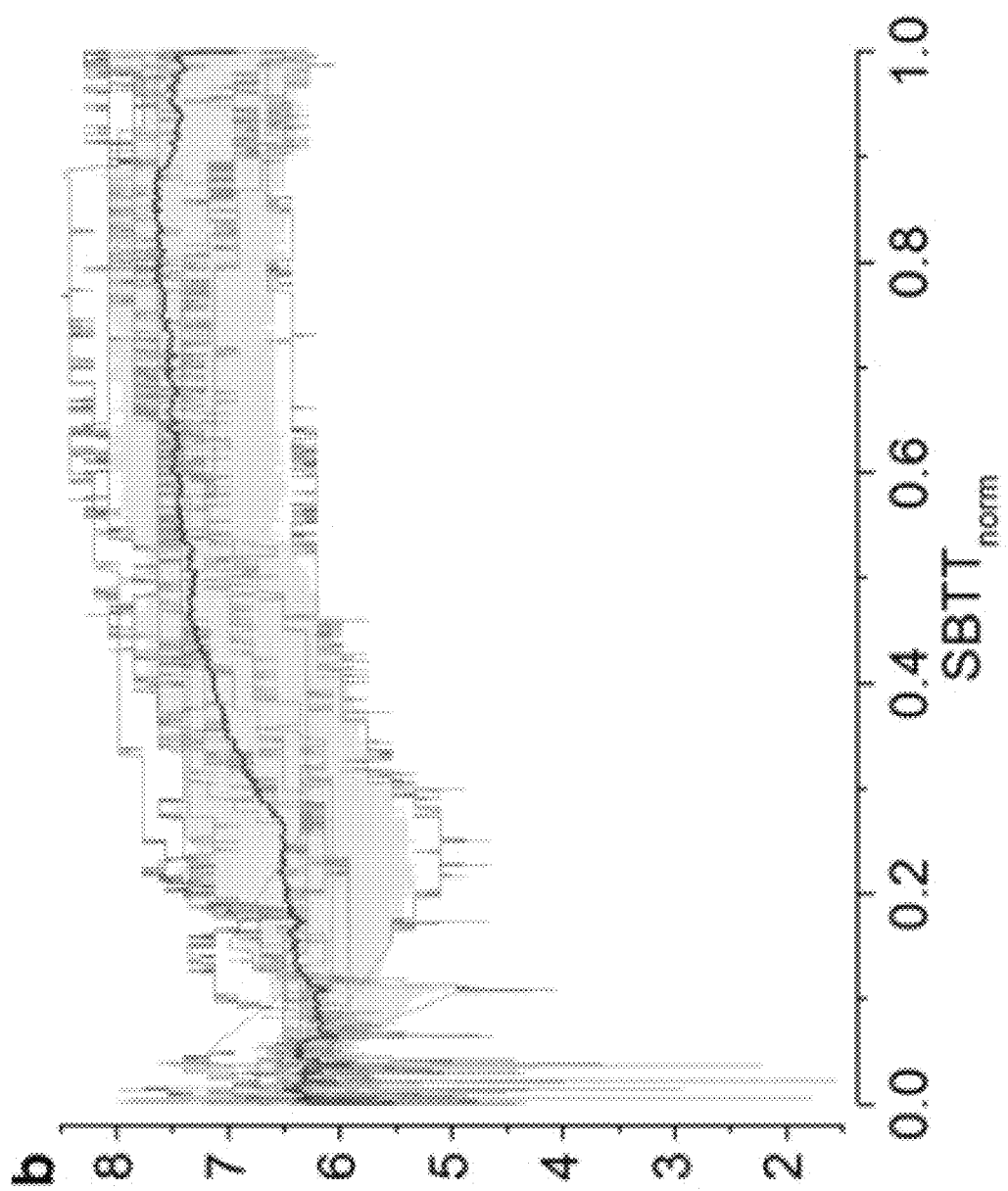
FIG. 5: pH distribution in the human small intestine. Taken from Koziolek et al., 2015. $SBTT_{norm}$=is the normalized Small Bowel Transfer Time (SBTT) between the gastric emptying time and the colon arrival time. Also this means that the Lipase according to the invention exhibits higher activity in comparison to the WT Lipase under conditions which reflect the in vivo situation.

FIG. 5: pH distribution in the human small intestine. Taken from Koziolek et al., 2015. $SBTT_{norm}$=is the normalized Small Bowel Transfer Time (SBTT) between the gastric emptying time and the colon arrival time. Also this means that the Lipase according to the invention exhibits higher activity in comparison to the WT Lipase under conditions which reflect the in vivo situation.

REFERENCES

Cassidy-Hanley, D. et al. (1997) Germline and somatic transformation of mating *Tetrahymena thermophila* by particle bombardment, Genetics, 146(1), pp. 135-147

Gargouri, Y. et al. (1986) 'Human gastric lipase. The effect of amphiphiles.', *Eur J Biochem,* 156(2), pp. 305-310

Nixon, M. and Chan, S. H. (1979) 'A simple and sensitive colorimetric method for the determination of long-chain free fatty acids in subcellular organelles.', *Anal Biochem,* 97(2), pp. 403-409.

QuickChange Protocol: http://kirschner.med.harvard.edu/files/protocols/Stratagene_quickchangepdf.pdf Loke P, Sim T S. A comparison of three site-directed mutagenesis kits. Z Naturforsch C. 2001 September-October; 56(9-10):810-3

Northfield T C, McColl I. Postprandial concentrations of free and conjugated bile acids down the length of the normal human small intestine. Gut. 1973 July; 14(7): 513-8

Koziolek M et al, Investigation of pH and Temperature Profiles in the GI Tract of Fasted Human Subjects Using the Intellicap System. *J Pharm Sci.* 2015 September; 104(9):2855-63

Brock et al., Novel ciliate lipases for enzyme replacement during exocrine pancreatic insufficiency. *Eur J Gastroenterol Hepatol.* 2016 November; 28(11):1305-12

Tondravi M M, Yao M C. Transformation of *Tetrahymena thermophila* by microinjection of ribosomal RNA genes. PNAS 1986 June; 83(12):4369-73

Gaertig J, Gorovsky M A. Efficient mass transformation of *Tetrahymena thermophila* by electroporation of conjugants. PNAS 1992 Oct. 1; 89(19):9196-200

Diogo M M, Silva S, Cabral J M, Queiroz J A. Hydrophobic interaction chromatography of *Chromobacterium viscosum* lipase J Chromatogr A. 1999 Jul. 23; 849(2):413-9.

Weide et al., A recombinase system facilitates cloning of expression cassettes in the ciliate *Tetrahymena thermophila.* BMC Microbiology 2007, 7:12

Weide et al., Secretion of functional human enzymes by *Tetrahymena thermophila.* BMC Biotechnol. 2006; 6: 19.

WO2007006812A1

WO 00/58483

WO 00/46381

WO 00/46381

Sequences

The following sequences form part of the disclosure of the present application. A WIPO ST 25 compatible electronic sequence listing is provided with this application, too. For the avoidance of doubt, if discrepancies exist between the sequences in the following table and the electronic sequence listing, the sequences in this table shall be deemed to be the correct ones.

| SEQ ID | Sequence | Comment |
|---|---|---|
| 1 | QSFTYTQSLAQDLAGFSLAS *Y* CNPKSIEQWNCGCACDKNPQGLRNVTI LFNSTLQASGYLGYSTHHDAIVVVFRG *T* VPWLIENWIADLNTFKTQYP LCQNCYVHQGFYNQFKQLKSQLVTSFTSLRQLYPNAKVFVTGHSLGAA MSAHSIPVIYQLNGNKPIDAFYNYGCPRVGDQTYANWFNSQNFALEYG RINNAADPVPHLPPLLYPFSFFHYNHEIFYPSFVLFGNQHNQCQNAET IFGADGVIIAANVLDHLTYFGWDWSGSILTCQ | Wildtype Lipase with the catalytic triad of D/H/S marked in bold underline and the residues that are related to the oxyanion pocket marked in Italics underline |
| 2 | ATGAAATTGTAATTGCTTCTATTGGTTTGCTTGTCATTTGCTGCCTGC TAATCATTTACTTATACTTAATCACTTGCTTAAGACTTAGCTGGTTTC TCTCTTGCTTCTTACTGTAATCCTAAATCTATAGAACAATGGAATTGT GGATGTGCTTGTGATAAAAACCCTTAAGGACTTCGAAATGTTACTATC TTATTTAACTCTACTCTATAAGCTAGTGGATATTTAGGCTACTCCACT CATCATGATGCAATTGTTGTTGTATTCAGAGGAACAGTACCTTGGTTA ATCGAAAATTGGATTGCTGACTTAAACACCTTCAAGACTTAGTACCCA CTCTGCCAAAACTGTTATGTCCATTAAGGCTTTTATAACCAGTTCAAA TAATTGAAATCTCAGCTTGTTACTAGCTTTACTTCACTTCGTTAACTA TATCCTAATGCAAAAGTATTTGTTACAGGACATTCTCTTGGTGCTGCA ATGAGTGCTCACTCAATACCAGTAATTTACTAATTAAATGGAAATAAA CCTATTGATGCTTTTTACAATTATGGTTGTCCTAGAGTAGGTGACTAA ACTTATGCAAACTGGTTTAACAGTTAAAATTTTGCCTTAGAATATGGT AGAATTAATAATGCTGCTGATCCAGTTCCTCATTTACCTCCTCTTCTT TACCCATTTTCATTTTTCCACTACAACCATGAAATATTCTATCCTTCT TTTGTTCTTTTTGGAAACTAACATAACTAATGTTAAAACGCGGAAACA ATATTTGGTGCAGATGGAGTAATAATAGCAGCTAATGTTCTAGACCAT CTAACTTATTTTGGATGGGATTGGTCTGGTTCTATATTAACTTGCTAA TGA | cDNA of Wildtype Lipase |
| 3 | QSFTYTQSLAQDLAGFSLASYCNPKSIEQWNCGCACDKNPQGLRNVTI LFNSTLKASGYLGYSTHHDAIVVVFRGTVPWLIENWIADLNTFKTQYP LCQNCYVHQGFYNQFKQLKSQLVTSFTSLRQLYPNAKVFVTGHSLGAA MSAHSIPVIYQLNGNKPIDAFYNYGCPRVGDQTYANWFNSQNFALEYG RINNAADPVPHLPPLLYPFSFFHYNHEIFYPSFVLFGNQHNQCQNAET IFGADGVIIAANVLDHLTYFGWDWSGSILTCQ | Wildtype Lipase with Q55K mutant marked in bold underline |
| 4 | QSFTYTQSLAQDLAGFSLASYCNPKSIEQWNCGCACDKNPQGLRNVTI LFNSTLRASGYLGYSTHHDAIVVVFRGTVPWLIENWIADLNTFKTQYP LCQNCYVHQGFYNQFKQLKSQLVTSFTSLRQLYPNAKVFVTGHSLGAA | Wildtype Lipase with Q55R mutant marked in bold underline |

| SEQ ID | Sequence | Comment |
|---|---|---|
| | MSAHSIPVIYQLNGNKPIDAFYNYGCPRVGDQTYANWFNSQNFALEYG<br>RINNAADPVPHLPPLLYPFSFFHYNHEIFYPSFVLFGNQHNQCQNAET<br>IFGADGVIIAANVLDHLTYFGWDWSGSILTCQ | |
| 5 | QSFTYTQSLAQDLAGFSLASYCNPKSIEQWNCGCACDKNPQGLRNVTI<br>LFNSTLHASGYLGYSTHHDAIVVFRGTVPWLIENWIADLNTFKTQYP<br>LCQNCYVHQGFYNQFKQLKSQLVTSFTSLRQLYPNAKVFVTGHSLGAA<br>MSAHSIPVIYQLNGNKPIDAFYNYGCPRVGDQTYANWFNSQNFALEYG<br>RINNAADPVPHLPPLLYPFSFFHYNHEIFYPSFVLFGNQHNQCQNAET<br>IFGADGVIIAANVLDHLTYFGWDWSGSILTCQ | Wildtype Lipase with Q55H mutant marked in bold underline |
| 6 | QSFTYTQSLAQDLAGFSLASYCNPKSIEQWNCGCACDKNPQGLRNVTI<br>LFNSTLQASGYLGYSTHHDAIIVVFRGTVPWLIENWIADLNTFKTQYP<br>LCQNCYVHQGFYNQFKQLKSQLVTSFTSLRQLYPNAKVFVTGHSLGAA<br>MSAHSIPIIYQLNGNKPIDAFYNYGCPRVGDQTYANWFNSQNFALEYG<br>RINNAADPVPHLPPLLYPFSFFHYNHEIFYPSFVLFGNQHNQCQNAET<br>IFGADGVIIAANVLDHLTYFGWDWSGSILTCQ | Wildtype Lipase with V70I/V152I substitution marked in bold underline |
| 7 | QSFTYTQSLAQDLAGFSLASYCNPKSIEQWNCGCACDKNPQGLRNVTI<br>LFNSTLQASGYLGYSTHHDAIVIVFRGTVPWLIENWIADLNTFKTQYP<br>LCQNCYVHQGFYNQFKQLKSQLVTSFTSLRQLYPNAKVFVTGHSLGAA<br>MSAHSIPVIYQLNGNKPIDAFYNYGCPRVGDQTYANWFNSQNFALEYG<br>RINNAADPVPHLPPILYPFSFFHYNHEIFYPSFVLFGNQHNQCQNAET<br>IFGADGVIIAANVLDHLTYFGWDWSGSILTCQ | Wildtype Lipase with V71I/L207I substitution marked in bold underline |
| 8 | QSFTYTQSLAQDLAGFSLASYCNPKSIEQWNCGCACDKNPQGLRNVTI<br>LFNSTLQASGYLGYSTHHDAIVVFRGTVPWLIENWIADLNTFKTQYP<br>LCQNCYVHQGFYNQFKQLKSQLITSFTSLRQLYPNAKVFVTGHSLGAA<br>MSAHSIPVIYQLNGNKPIDAFYNFGCPRVGDQTYANWFNSQNFALEYG<br>RINNAADPVPHLPPLLYPFSFFHYNHEIFYPSFVLFGNQHNQCQNAET<br>IFGADGVIIAANVLDHLTYFGWDWSGSILTCQ | Wildtype Lipase with V119I/Y168F substitution marked in bold underline |
| 9 | MKLQLLLLVCLSFAAC | Lead peptide |
| 10 | QSFTYTQSLAQDLAGFSLASYCNPKSIEQWNCGCACDKNPQGLRNVTI<br>LFNSTLKASGYLGYSTHHDAIIVVFRGTVPWLIENWIADLNTFKTQYP<br>LCQNCYVHQGFYNQFKQLKSQLVTSFTSLRQLYPNAKVFVTGHSLGAA<br>MSAHSIPIIYQLNGNKPIDAFYNYGCPRVGDQTYANWFNSQNFALEYG<br>RINNAADPVPHLPPLLYPFSFFHYNHEIFYPSFVLFGNQHNQCQNAET<br>IFGADGVIIAANVLDHLTYFGWDWSGSILTCQ | Wildtype Lipase with V70I/V152I substitution having the Q55K mutation |
| 11 | QSFTYTQSLAQDLAGFSLASYCNPKSIEQWNCGCACDKNPQGLRNVTI<br>LFNSTLKASGYLGYSTHHDAIVIVFRGTVPWLIENWIADLNTFKTQYP<br>LCQNCYVHQGFYNQFKQLKSQLVTSFTSLRQLYPNAKVFVTGHSLGAA<br>MSAHSIPVIYQLNGNKPIDAFYNYGCPRVGDQTYANWFNSQNFALEYG<br>RINNAADPVPHLPPILYPFSFFHYNHEIFYPSFVLFGNQHNQCQNAET<br>IFGADGVIIAANVLDHLTYFGWDWSGSILTCQ | Wildtype Lipase with V71I/L207I substitution having the Q55K mutation |
| 12 | QSFTYTQSLAQDLAGFSLASYCNPKSIEQWNCGCACDKNPQGLRNVTI<br>LFNSTLKASGYLGYSTHHDAIVVFRGTVPWLIENWIADLNTFKTQYP<br>LCQNCYVHQGFYNQFKQLKSQLITSFTSLRQLYPNAKVFVTGHSLGAA<br>MSAHSIPVIYQLNGNKPIDAFYNFGCPRVGDQTYANWFNSQNFALEYG<br>RINNAADPVPHLPPLLYPFSFFHYNHEIFYPSFVLFGNQHNQCQNAET<br>IFGADGVIIAANVLDHLTYFGWDWSGSILTCQ | Wildtype Lipase with V119I/Y168F substitution having the Q55K mutation, marked in bold underline |
| 13 | QSFTYTQSLAQDLAGFSLASYCNPKSIEQWNCGCACDKNPQGLRNVTI<br>LFNSTLRASGYLGYSTHHDAIIVVFRGTVPWLIENWIADLNTFKTQYP<br>LCQNCYVHQGFYNQFKQLKSQLVTSFTSLRQLYPNAKVFVTGHSLGAA<br>MSAHSIPIIYQLNGNKPIDAFYNYGCPRVGDQTYANWFNSQNFALEYG<br>RINNAADPVPHLPPLLYPFSFFHYNHEIFYPSFVLFGNQHNQCQNAET<br>IFGADGVIIAANVLDHLTYFGWDWSGSILTCQ | Wildtype Lipase with V70I/V152I substitution having the Q55R mutation marked in bold underline |
| 14 | QSFTYTQSLAQDLAGFSLASYCNPKSIEQWNCGCACDKNPQGLRNVTI<br>LFNSTLRASGYLGYSTHHDAIVIVFRGTVPWLIENWIADLNTFKTQYP<br>LCQNCYVHQGFYNQFKQLKSQLVTSFTSLRQLYPNAKVFVTGHSLGAA<br>MSAHSIPVIYQLNGNKPIDAFYNYGCPRVGDQTYANWFNSQNFALEYG<br>RINNAADPVPHLPPILYPFSFFHYNHEIFYPSFVLFGNQHNQCQNAET<br>IFGADGVIIAANVLDHLTYFGWDWSGSILTCQ | Wildtype Lipase with V71I/L207I substitution having the Q55R mutation marked in bold underline |
| 15 | QSFTYTQSLAQDLAGFSLASYCNPKSIEQWNCGCACDKNPQGLRNVTI<br>LFNSTLRASGYLGYSTHHDAIVVFRGTVPWLIENWIADLNTFKTQYP<br>LCQNCYVHQGFYNQFKQLKSQLITSFTSLRQLYPNAKVFVTGHSLGAA<br>MSAHSIPVIYQLNGNKPIDAFYNFGCPRVGDQTYANWFNSQNFALEYG<br>RINNAADPVPHLPPLLYPFSFFHYNHEIFYPSFVLFGNQHNQCQNAET<br>IFGADGVIIAANVLDHLTYFGWDWSGSILTCQ | Wildtype Lipase with V119I/Y168F substitution having the Q55R mutation marked in bold underline |

| SEQ ID | Sequence | Comment |
|---|---|---|
| 16 | QSFTYTQSLAQDLAGFSLASYCNPKSIEQWNCGCACDKNPQGLRNVTI LFNSTLHASGYLGYSTHHDAIIVVFRGTVPWLIENWIADLNTFKTQYP LCQNCYVHQGFYNQFKQLKSQLVTSFTSLRQLYPNAKVFVTGHSLGAA MSAHSIPIIYQLNGNKPIDAFYNYGCPRVGDQTYANWFNSQNFALEYG RINNAADPVPHLPPLLYPSFFHYNHEIFYPSFVLFGNQHNQCQNAET IFGADGVIIAANVLDHLTYFGWDWSGSILTCQ | Wildtype Lipase with V70I/V152I substitution having the Q55H mutation |
| 17 | QSFTYTQSLAQDLAGFSLASYCNPKSIEQWNCGCACDKNPQGLRNVTI LFNSTLHASGYLGYSTHHDAIVIVFRGTVPWLIENWIADLNTFKTQYP LCQNCYVHQGFYNQFKQLKSQLVTSFTSLRQLYPNAKVFVTGHSLGAA MSAHSIPVIYQLNGNKPIDAFYNYGCPRVGDQTYANWFNSQNFALEYG RINNAADPVPHLPPILYPSFFHYNHEIFYPSFVLFGNQHNQCQNAET IFGADGVIIAANVLDHLTYFGWDWSGSILTCQ | Wildtype Lipase with V71I/L207I substitution having the Q55H mutation marked in bold underline |
| 18 | QSFTYTQSLAQDLAGFSLASYCNPKSIEQWNCGCACDKNPQGLRNVTI LFNSTLHASGYLGYSTHHDAIVVFRGTVPWLIENWIADLNTFKTQYP LCQNCYVHQGFYNQFKQLKSQLITSFTSLRQLYPNAKVFVTGHSLGAA MSAHSIPVIYQLNGNKPIDAFYNFGCPRVGDQTYANWFNSQNFALEYG RINNAADPVPHLPPLLYPSFFHYNHEIFYPSFVLFGNQHNQCQNAET IFGADGVIIAANVLDHLTYFGWDWSGSILTCQ | Wildtype Lipase with V119I/Y168F substitution having the Q55H mutation marked in bold underline |

What is claimed is:

1. A lipase enzyme comprising an amino acid sequence that has at least 90% sequence identity with SEQ ID NO 1, or comprising a functional fragment thereof encompassing position Q55, with the proviso that the lipase enzyme has a substitution of an amino acid with a basic side chain at neutral pH in position Q55.

2. The lipase enzyme according to claim 1, wherein the substitution is by an amino acid selected from the group consisting of Lysine (K), Arginine (R) and Histidine (H).

3. The lipase enzyme according to claim 1, wherein the substitution in position Q55 is Q55K.

4. The lipase enzyme according to claim 1, which has a lipolytic activity of at least 30,000 U/g.

5. The lipase enzyme according to claim 1, which comprises at least one conservative amino acid substitution in addition to the substitution in position Q55, compared to the amino acid according to SEQ ID NO 1.

6. The lipase enzyme according to claim 1, wherein the lipase enzyme has an increased lipolytic activity in a medium having a pH of ≥5.5, compared to a lipase enzyme that has the amino acid sequence of SEQ ID NO 1.

7. The lipase enzyme according to claim 1, wherein the lipase enzyme has an increased lipolytic activity in a medium having a total bile salt concentration of ≥2.5 mM, compared to a lipase enzyme that has the amino acid sequence of SEQ ID NO 1.

8. The lipase enzyme according to claim 1, wherein the lipase enzyme has an increased lipolytic activity in a medium comprising a mixture of two or more different bile acids, compared to a lipase enzyme that has the amino acid sequence of SEQ ID NO 1.

9. A nucleic acid that encodes for a lipase enzyme comprising an amino acid sequence that has at least 90% sequence identity with SEQ ID NO 1, or comprising a functional fragment thereof encompassing position Q55, with the proviso that the lipase enzyme has a substitution of an amino acid with a basic side chain at neutral pH in position Q55.

10. A pharmaceutical composition comprising the lipase enzyme according to claim 1 and one or more pharmaceutically acceptable excipients.

11. A combination comprising (i) the lipase enzyme according to claim 1 and (ii) one or more therapeutically active compounds.

12. A method for treating or preventing a lipid digestion deficiency, a digestive disorder or an inflammatory condition, which method comprises administration, to a human or animal subject, of the lipase enzyme according to claim 1 in a therapeutically sufficient dose.

13. A therapeutic kit of parts comprising: a) the lipase enzyme according to claim 1, b) an apparatus for administering the lipase enzyme, and c) instructions for use.

14. A method of producing a lipase enzyme according to claim 1, which method comprises the steps of a) expressing the lipase enzyme in an expression host from the order ciliates, and b) purifying the lipase enzyme expressed in step a).

15. The method according to claim 14, which method comprises, before step a), the step of transforming the ciliate with a vector encoding for the lipase enzyme.

16. The method according to claim 14, wherein the expression host is from the genus *Tetrahymena*.

17. The method according to claim 14, wherein the expression host is *Tetrahymena thermophila*.

* * * * *

```
                           SEQUENCE LISTING

<160> NUMBER OF SEQ ID NOS: 18

<210> SEQ ID NO 1
<211> LENGTH: 272
<212> TYPE: PRT
<213> ORGANISM: Tetrahymena thermophila

<400> SEQUENCE: 1

Gln Ser Phe Thr Tyr Thr Gln Ser Leu Ala Gln Asp Leu Ala Gly Phe
1               5                   10                  15

Ser Leu Ala Ser Tyr Cys Asn Pro Lys Ser Ile Glu Gln Trp Asn Cys
            20                  25                  30

Gly Cys Ala Cys Asp Lys Asn Pro Gln Gly Leu Arg Asn Val Thr Ile
        35                  40                  45

Leu Phe Asn Ser Thr Leu Gln Ala Ser Gly Tyr Leu Gly Tyr Ser Thr
    50                  55                  60

His His Asp Ala Ile Val Val Phe Arg Gly Thr Val Pro Trp Leu
65                  70                  75                  80

Ile Glu Asn Trp Ile Ala Asp Leu Asn Thr Phe Lys Thr Gln Tyr Pro
                85                  90                  95

Leu Cys Gln Asn Cys Tyr Val His Gln Gly Phe Tyr Asn Gln Phe Lys
            100                 105                 110

Gln Leu Lys Ser Gln Leu Val Thr Ser Phe Thr Ser Leu Arg Gln Leu
        115                 120                 125

Tyr Pro Asn Ala Lys Val Phe Val Thr Gly His Ser Leu Gly Ala Ala
    130                 135                 140

Met Ser Ala His Ser Ile Pro Val Ile Tyr Gln Leu Asn Gly Asn Lys
145                 150                 155                 160

Pro Ile Asp Ala Phe Tyr Asn Tyr Gly Cys Pro Arg Val Gly Asp Gln
                165                 170                 175

Thr Tyr Ala Asn Trp Phe Asn Ser Gln Asn Phe Ala Leu Glu Tyr Gly
            180                 185                 190

Arg Ile Asn Asn Ala Ala Asp Pro Val Pro His Leu Pro Pro Leu Leu
        195                 200                 205
```

Tyr Pro Phe Ser Phe Phe His Tyr Asn His Glu Ile Phe Tyr Pro Ser
    210                 215                 220

Phe Val Leu Phe Gly Asn Gln His Asn Gln Cys Gln Asn Ala Glu Thr
225                 230                 235                 240

Ile Phe Gly Ala Asp Gly Val Ile Ile Ala Ala Asn Val Leu Asp His
            245                 250                 255

Leu Thr Tyr Phe Gly Trp Asp Trp Ser Gly Ser Ile Leu Thr Cys Gln
            260                 265                 270

<210> SEQ ID NO 2
<211> LENGTH: 867
<212> TYPE: DNA
<213> ORGANISM: Tetrahymena thermophila

<400> SEQUENCE: 2

```
atgaaattgt aattgcttct attggtttgc ttgtcatttg ctgcctgcta atcatttact    60
tatacttaat cacttgctta agacttagct ggtttctctc ttgcttctta ctgtaatcct   120
aaatctatag aacaatggaa ttgtggatgt gcttgtgata aaaacccctta aggacttcga  180
aatgttacta tcttatttaa ctctactcta taagctagtg atatttaggc tactccact   240
catcatgatg caattgttgt tgtattcaga ggaacagtac cttggttaat cgaaaattgg  300
attgctgact taaacacctt caagacttag tacccactct gccaaaactg ttatgtccat  360
taaggctttt ataaccagtt caaataattg aaatctcagc ttgttactag ctttacttca  420
cttcgttaac tatatcctaa tgcaaaagta tttgttacag acattctct tggtgctgca    480
atgagtgctc actcaatacc agtaatttac taattaaatg gaaataaacc tattgatgct  540
ttttacaatt atggttgtcc tagagtaggt gactaaactt atgcaaactg gtttaacagt  600
taaaattttg ccttagaata tggtagaatt aataatgctg ctgatccagt tcctcattta  660
cctcctcttc tttacccatt tcattttttc cactacaacc atgaaatatt ctatccttct  720
tttgttcttt ttggaaacta acataactaa tgttaaaacg cggaaacaat atttggtgca  780
gatggagtaa taatagcagc taatgttcta gaccatctaa cttattttgg atgggattgg  840
tctggttcta tattaacttg ctaatga                                      867
```

<210> SEQ ID NO 3
<211> LENGTH: 272
<212> TYPE: PRT
<213> ORGANISM: artificial sequence
<220> FEATURE:
<223> OTHER INFORMATION: Lipase mutant

<400> SEQUENCE: 3

Gln Ser Phe Thr Tyr Thr Gln Ser Leu Ala Gln Asp Leu Ala Gly Phe
1               5                   10                  15

Ser Leu Ala Ser Tyr Cys Asn Pro Lys Ser Ile Glu Gln Trp Asn Cys
            20                  25                  30

Gly Cys Ala Cys Asp Lys Asn Pro Gln Gly Leu Arg Asn Val Thr Ile
        35                  40                  45

Leu Phe Asn Ser Thr Leu Lys Ala Ser Gly Tyr Leu Gly Tyr Ser Thr
    50                  55                  60

His His Asp Ala Ile Val Val Phe Arg Gly Thr Val Pro Trp Leu
65                  70                  75                  80

Ile Glu Asn Trp Ile Ala Asp Leu Asn Thr Phe Lys Thr Gln Tyr Pro
                85                  90                  95

-continued

```
Leu Cys Gln Asn Cys Tyr Val His Gln Gly Phe Tyr Asn Gln Phe Lys
                100                 105                 110

Gln Leu Lys Ser Gln Leu Val Thr Ser Phe Thr Ser Leu Arg Gln Leu
            115                 120                 125

Tyr Pro Asn Ala Lys Val Phe Val Thr Gly His Ser Leu Gly Ala Ala
        130                 135                 140

Met Ser Ala His Ser Ile Pro Val Ile Tyr Gln Leu Asn Gly Asn Lys
145                 150                 155                 160

Pro Ile Asp Ala Phe Tyr Asn Tyr Gly Cys Pro Arg Val Gly Asp Gln
                165                 170                 175

Thr Tyr Ala Asn Trp Phe Asn Ser Gln Asn Phe Ala Leu Glu Tyr Gly
            180                 185                 190

Arg Ile Asn Asn Ala Ala Asp Pro Val Pro His Leu Pro Pro Leu Leu
        195                 200                 205

Tyr Pro Phe Ser Phe Phe His Tyr Asn His Glu Ile Phe Tyr Pro Ser
    210                 215                 220

Phe Val Leu Phe Gly Asn Gln His Asn Gln Cys Gln Asn Ala Glu Thr
225                 230                 235                 240

Ile Phe Gly Ala Asp Gly Val Ile Ile Ala Ala Asn Val Leu Asp His
                245                 250                 255

Leu Thr Tyr Phe Gly Trp Asp Trp Ser Gly Ser Ile Leu Thr Cys Gln
            260                 265                 270

<210> SEQ ID NO 4
<211> LENGTH: 272
<212> TYPE: PRT
<213> ORGANISM: artificial sequence
<220> FEATURE:
<223> OTHER INFORMATION: Lipase mutant

<400> SEQUENCE: 4

Gln Ser Phe Thr Tyr Thr Gln Ser Leu Ala Gln Asp Leu Ala Gly Phe
1               5                   10                  15

Ser Leu Ala Ser Tyr Cys Asn Pro Lys Ser Ile Glu Gln Trp Asn Cys
            20                  25                  30

Gly Cys Ala Cys Asp Lys Asn Pro Gln Gly Leu Arg Asn Val Thr Ile
        35                  40                  45

Leu Phe Asn Ser Thr Leu Arg Ala Ser Gly Tyr Leu Gly Tyr Ser Thr
    50                  55                  60

His His Asp Ala Ile Val Val Phe Arg Gly Thr Val Pro Trp Leu
65                  70                  75                  80

Ile Glu Asn Trp Ile Ala Asp Leu Asn Thr Phe Lys Thr Gln Tyr Pro
                85                  90                  95

Leu Cys Gln Asn Cys Tyr Val His Gln Gly Phe Tyr Asn Gln Phe Lys
                100                 105                 110

Gln Leu Lys Ser Gln Leu Val Thr Ser Phe Thr Ser Leu Arg Gln Leu
            115                 120                 125

Tyr Pro Asn Ala Lys Val Phe Val Thr Gly His Ser Leu Gly Ala Ala
        130                 135                 140

Met Ser Ala His Ser Ile Pro Val Ile Tyr Gln Leu Asn Gly Asn Lys
145                 150                 155                 160

Pro Ile Asp Ala Phe Tyr Asn Tyr Gly Cys Pro Arg Val Gly Asp Gln
                165                 170                 175

Thr Tyr Ala Asn Trp Phe Asn Ser Gln Asn Phe Ala Leu Glu Tyr Gly
            180                 185                 190
```

Arg Ile Asn Asn Ala Ala Asp Pro Val Pro His Leu Pro Leu Leu
         195                 200                 205

Tyr Pro Phe Ser Phe Phe His Tyr Asn His Glu Ile Phe Tyr Pro Ser
210                 215                 220

Phe Val Leu Phe Gly Asn Gln His Asn Gln Cys Gln Asn Ala Glu Thr
225                 230                 235                 240

Ile Phe Gly Ala Asp Gly Val Ile Ile Ala Ala Asn Val Leu Asp His
                245                 250                 255

Leu Thr Tyr Phe Gly Trp Asp Trp Ser Gly Ser Ile Leu Thr Cys Gln
                260                 265                 270

<210> SEQ ID NO 5
<211> LENGTH: 272
<212> TYPE: PRT
<213> ORGANISM: artificial sequence
<220> FEATURE:
<223> OTHER INFORMATION: Lipase mutant

<400> SEQUENCE: 5

Gln Ser Phe Thr Tyr Thr Gln Ser Leu Ala Gln Asp Leu Ala Gly Phe
1               5                   10                  15

Ser Leu Ala Ser Tyr Cys Asn Pro Lys Ser Ile Glu Gln Trp Asn Cys
                20                  25                  30

Gly Cys Ala Cys Asp Lys Asn Pro Gln Gly Leu Arg Asn Val Thr Ile
            35                  40                  45

Leu Phe Asn Ser Thr Leu His Ala Ser Gly Tyr Leu Gly Tyr Ser Thr
        50                  55                  60

His His Asp Ala Ile Val Val Phe Arg Gly Thr Val Pro Trp Leu
65                  70                  75                  80

Ile Glu Asn Trp Ile Ala Asp Leu Asn Thr Phe Lys Thr Gln Tyr Pro
                85                  90                  95

Leu Cys Gln Asn Cys Tyr Val His Gln Gly Phe Tyr Asn Gln Phe Lys
            100                 105                 110

Gln Leu Lys Ser Gln Leu Val Thr Ser Phe Thr Ser Leu Arg Gln Leu
        115                 120                 125

Tyr Pro Asn Ala Lys Val Phe Val Thr Gly His Ser Leu Gly Ala Ala
    130                 135                 140

Met Ser Ala His Ser Ile Pro Val Ile Tyr Gln Leu Asn Gly Asn Lys
145                 150                 155                 160

Pro Ile Asp Ala Phe Tyr Asn Tyr Gly Cys Pro Arg Val Gly Asp Gln
                165                 170                 175

Thr Tyr Ala Asn Trp Phe Asn Ser Gln Asn Phe Ala Leu Glu Tyr Gly
            180                 185                 190

Arg Ile Asn Asn Ala Ala Asp Pro Val Pro His Leu Pro Leu Leu
        195                 200                 205

Tyr Pro Phe Ser Phe Phe His Tyr Asn His Glu Ile Phe Tyr Pro Ser
210                 215                 220

Phe Val Leu Phe Gly Asn Gln His Asn Gln Cys Gln Asn Ala Glu Thr
225                 230                 235                 240

Ile Phe Gly Ala Asp Gly Val Ile Ile Ala Ala Asn Val Leu Asp His
                245                 250                 255

Leu Thr Tyr Phe Gly Trp Asp Trp Ser Gly Ser Ile Leu Thr Cys Gln
                260                 265                 270

<210> SEQ ID NO 6
<211> LENGTH: 272

```
<212> TYPE: PRT
<213> ORGANISM: artificial sequence
<220> FEATURE:
<223> OTHER INFORMATION: Lipase mutant

<400> SEQUENCE: 6

Gln Ser Phe Thr Tyr Thr Gln Ser Leu Ala Gln Asp Leu Ala Gly Phe
1               5                   10                  15

Ser Leu Ala Ser Tyr Cys Asn Pro Lys Ser Ile Glu Gln Trp Asn Cys
                20                  25                  30

Gly Cys Ala Cys Asp Lys Asn Pro Gln Gly Leu Arg Asn Val Thr Ile
            35                  40                  45

Leu Phe Asn Ser Thr Leu Gln Ala Ser Gly Tyr Leu Gly Tyr Ser Thr
50                  55                  60

His His Asp Ala Ile Ile Val Val Phe Arg Gly Thr Val Pro Trp Leu
65                  70                  75                  80

Ile Glu Asn Trp Ile Ala Asp Leu Asn Thr Phe Lys Thr Gln Tyr Pro
                85                  90                  95

Leu Cys Gln Asn Cys Tyr Val His Gln Gly Phe Tyr Asn Gln Phe Lys
                100                 105                 110

Gln Leu Lys Ser Gln Leu Val Thr Ser Phe Thr Ser Leu Arg Gln Leu
            115                 120                 125

Tyr Pro Asn Ala Lys Val Phe Val Thr Gly His Ser Leu Gly Ala Ala
130                 135                 140

Met Ser Ala His Ser Ile Pro Ile Ile Tyr Gln Leu Asn Gly Asn Lys
145                 150                 155                 160

Pro Ile Asp Ala Phe Tyr Asn Tyr Gly Cys Pro Arg Val Gly Asp Gln
                165                 170                 175

Thr Tyr Ala Asn Trp Phe Asn Ser Gln Asn Phe Ala Leu Glu Tyr Gly
            180                 185                 190

Arg Ile Asn Asn Ala Ala Asp Pro Val Pro His Leu Pro Pro Leu Leu
195                 200                 205

Tyr Pro Phe Ser Phe His Tyr Asn His Glu Ile Phe Tyr Pro Ser
210                 215                 220

Phe Val Leu Phe Gly Asn Gln His Asn Gln Cys Gln Asn Ala Glu Thr
225                 230                 235                 240

Ile Phe Gly Ala Asp Gly Val Ile Ile Ala Ala Asn Val Leu Asp His
                245                 250                 255

Leu Thr Tyr Phe Gly Trp Asp Trp Ser Gly Ser Ile Leu Thr Cys Gln
            260                 265                 270

<210> SEQ ID NO 7
<211> LENGTH: 272
<212> TYPE: PRT
<213> ORGANISM: artificial sequence
<220> FEATURE:
<223> OTHER INFORMATION: Lipase mutant

<400> SEQUENCE: 7

Gln Ser Phe Thr Tyr Thr Gln Ser Leu Ala Gln Asp Leu Ala Gly Phe
1               5                   10                  15

Ser Leu Ala Ser Tyr Cys Asn Pro Lys Ser Ile Glu Gln Trp Asn Cys
                20                  25                  30

Gly Cys Ala Cys Asp Lys Asn Pro Gln Gly Leu Arg Asn Val Thr Ile
            35                  40                  45

Leu Phe Asn Ser Thr Leu Gln Ala Ser Gly Tyr Leu Gly Tyr Ser Thr
50                  55                  60
```

```
His His Asp Ala Ile Val Ile Val Phe Arg Gly Thr Val Pro Trp Leu
 65                  70                  75                  80

Ile Glu Asn Trp Ile Ala Asp Leu Asn Thr Phe Lys Thr Gln Tyr Pro
                 85                  90                  95

Leu Cys Gln Asn Cys Tyr Val His Gln Gly Phe Tyr Asn Gln Phe Lys
            100                 105                 110

Gln Leu Lys Ser Gln Leu Val Thr Ser Phe Thr Ser Leu Arg Gln Leu
        115                 120                 125

Tyr Pro Asn Ala Lys Val Phe Val Thr Gly His Ser Leu Gly Ala Ala
    130                 135                 140

Met Ser Ala His Ser Ile Pro Val Ile Tyr Gln Leu Asn Gly Asn Lys
145                 150                 155                 160

Pro Ile Asp Ala Phe Tyr Asn Tyr Gly Cys Pro Arg Val Gly Asp Gln
                165                 170                 175

Thr Tyr Ala Asn Trp Phe Asn Ser Gln Asn Phe Ala Leu Glu Tyr Gly
            180                 185                 190

Arg Ile Asn Asn Ala Ala Asp Pro Val Pro His Leu Pro Pro Ile Leu
        195                 200                 205

Tyr Pro Phe Ser Phe Phe His Tyr Asn His Glu Ile Phe Tyr Pro Ser
    210                 215                 220

Phe Val Leu Phe Gly Asn Gln His Asn Gln Cys Gln Asn Ala Glu Thr
225                 230                 235                 240

Ile Phe Gly Ala Asp Gly Val Ile Ala Ala Asn Val Leu Asp His
                245                 250                 255

Leu Thr Tyr Phe Gly Trp Asp Trp Ser Gly Ser Ile Leu Thr Cys Gln
                260                 265                 270
```

<210> SEQ ID NO 8
<211> LENGTH: 272
<212> TYPE: PRT
<213> ORGANISM: artificial sequence
<220> FEATURE:
<223> OTHER INFORMATION: Lipase mutant

<400> SEQUENCE: 8

```
Gln Ser Phe Thr Tyr Thr Gln Ser Leu Ala Gln Asp Leu Ala Gly Phe
 1               5                  10                  15

Ser Leu Ala Ser Tyr Cys Asn Pro Lys Ser Ile Glu Gln Trp Asn Cys
                 20                  25                  30

Gly Cys Ala Cys Asp Lys Asn Pro Gln Gly Leu Arg Asn Val Thr Ile
            35                  40                  45

Leu Phe Asn Ser Thr Leu Gln Ala Ser Gly Tyr Leu Gly Tyr Ser Thr
 50                  55                  60

His His Asp Ala Ile Val Val Phe Arg Gly Thr Val Pro Trp Leu
 65                  70                  75                  80

Ile Glu Asn Trp Ile Ala Asp Leu Asn Thr Phe Lys Thr Gln Tyr Pro
                 85                  90                  95

Leu Cys Gln Asn Cys Tyr Val His Gln Gly Phe Tyr Asn Gln Phe Lys
            100                 105                 110

Gln Leu Lys Ser Gln Leu Ile Thr Ser Phe Thr Ser Leu Arg Gln Leu
        115                 120                 125

Tyr Pro Asn Ala Lys Val Phe Val Thr Gly His Ser Leu Gly Ala Ala
    130                 135                 140

Met Ser Ala His Ser Ile Pro Val Ile Tyr Gln Leu Asn Gly Asn Lys
145                 150                 155                 160
```

Pro Ile Asp Ala Phe Tyr Asn Phe Gly Cys Pro Arg Val Gly Asp Gln
                165                 170                 175

Thr Tyr Ala Asn Trp Phe Asn Ser Gln Asn Phe Ala Leu Glu Tyr Gly
            180                 185                 190

Arg Ile Asn Asn Ala Ala Asp Pro Val Pro His Leu Pro Pro Leu Leu
        195                 200                 205

Tyr Pro Phe Ser Phe His Tyr Asn His Glu Ile Phe Tyr Pro Ser
210                 215                 220

Phe Val Leu Phe Gly Asn Gln His Asn Gln Cys Gln Asn Ala Glu Thr
225                 230                 235                 240

Ile Phe Gly Ala Asp Gly Val Ile Ile Ala Ala Asn Val Leu Asp His
                245                 250                 255

Leu Thr Tyr Phe Gly Trp Asp Trp Ser Gly Ser Ile Leu Thr Cys Gln
                260                 265                 270

<210> SEQ ID NO 9
<211> LENGTH: 16
<212> TYPE: PRT
<213> ORGANISM: artificial sequence
<220> FEATURE:
<223> OTHER INFORMATION: Lead peptide

<400> SEQUENCE: 9

Met Lys Leu Gln Leu Leu Leu Val Cys Leu Ser Phe Ala Ala Cys
1               5                   10                  15

<210> SEQ ID NO 10
<211> LENGTH: 272
<212> TYPE: PRT
<213> ORGANISM: artificial sequence
<220> FEATURE:
<223> OTHER INFORMATION: Lipase mutant

<400> SEQUENCE: 10

Gln Ser Phe Thr Tyr Thr Gln Ser Leu Ala Gln Asp Leu Ala Gly Phe
1               5                   10                  15

Ser Leu Ala Ser Tyr Cys Asn Pro Lys Ser Ile Glu Gln Trp Asn Cys
            20                  25                  30

Gly Cys Ala Cys Asp Lys Asn Pro Gln Gly Leu Arg Asn Val Thr Ile
        35                  40                  45

Leu Phe Asn Ser Thr Leu Lys Ala Ser Gly Tyr Leu Gly Tyr Ser Thr
    50                  55                  60

His His Asp Ala Ile Ile Val Val Phe Arg Gly Thr Val Pro Trp Leu
65                  70                  75                  80

Ile Glu Asn Trp Ile Ala Asp Leu Asn Thr Phe Lys Thr Gln Tyr Pro
                85                  90                  95

Leu Cys Gln Asn Cys Tyr Val His Gln Gly Phe Tyr Asn Gln Phe Lys
            100                 105                 110

Gln Leu Lys Ser Gln Leu Val Thr Ser Phe Thr Ser Leu Arg Gln Leu
        115                 120                 125

Tyr Pro Asn Ala Lys Val Phe Val Thr Gly His Ser Leu Gly Ala Ala
    130                 135                 140

Met Ser Ala His Ser Ile Pro Ile Ile Tyr Gln Leu Asn Gly Asn Lys
145                 150                 155                 160

Pro Ile Asp Ala Phe Tyr Asn Tyr Gly Cys Pro Arg Val Gly Asp Gln
                165                 170                 175

Thr Tyr Ala Asn Trp Phe Asn Ser Gln Asn Phe Ala Leu Glu Tyr Gly
            180                 185                 190

Arg Ile Asn Asn Ala Ala Asp Pro Val Pro His Leu Pro Pro Leu Leu
        195                 200                 205

Tyr Pro Phe Ser Phe Phe His Tyr Asn His Glu Ile Phe Tyr Pro Ser
210                 215                 220

Phe Val Leu Phe Gly Asn Gln His Asn Gln Cys Gln Asn Ala Glu Thr
225                 230                 235                 240

Ile Phe Gly Ala Asp Gly Val Ile Ile Ala Ala Asn Val Leu Asp His
                245                 250                 255

Leu Thr Tyr Phe Gly Trp Asp Trp Ser Gly Ser Ile Leu Thr Cys Gln
            260                 265                 270

<210> SEQ ID NO 11
<211> LENGTH: 272
<212> TYPE: PRT
<213> ORGANISM: artificial sequence
<220> FEATURE:
<223> OTHER INFORMATION: Lipase mutant

<400> SEQUENCE: 11

Gln Ser Phe Thr Tyr Thr Gln Ser Leu Ala Gln Asp Leu Ala Gly Phe
1               5                   10                  15

Ser Leu Ala Ser Tyr Cys Asn Pro Lys Ser Ile Glu Gln Trp Asn Cys
            20                  25                  30

Gly Cys Ala Cys Asp Lys Asn Pro Gln Gly Leu Arg Asn Val Thr Ile
        35                  40                  45

Leu Phe Asn Ser Thr Leu Lys Ala Ser Gly Tyr Leu Gly Tyr Ser Thr
50                  55                  60

His His Asp Ala Ile Val Ile Val Phe Arg Gly Thr Val Pro Trp Leu
65                  70                  75                  80

Ile Glu Asn Trp Ile Ala Asp Leu Asn Thr Phe Lys Thr Gln Tyr Pro
                85                  90                  95

Leu Cys Gln Asn Cys Tyr Val His Gln Gly Phe Tyr Asn Gln Phe Lys
            100                 105                 110

Gln Leu Lys Ser Gln Leu Val Thr Ser Phe Thr Ser Leu Arg Gln Leu
        115                 120                 125

Tyr Pro Asn Ala Lys Val Phe Val Thr Gly His Ser Leu Gly Ala Ala
130                 135                 140

Met Ser Ala His Ser Ile Pro Val Ile Tyr Gln Leu Asn Gly Asn Lys
145                 150                 155                 160

Pro Ile Asp Ala Phe Tyr Asn Tyr Gly Cys Pro Arg Val Gly Asp Gln
                165                 170                 175

Thr Tyr Ala Asn Trp Phe Asn Ser Gln Asn Phe Ala Leu Glu Tyr Gly
            180                 185                 190

Arg Ile Asn Asn Ala Ala Asp Pro Val Pro His Leu Pro Pro Ile Leu
        195                 200                 205

Tyr Pro Phe Ser Phe Phe His Tyr Asn His Glu Ile Phe Tyr Pro Ser
210                 215                 220

Phe Val Leu Phe Gly Asn Gln His Asn Gln Cys Gln Asn Ala Glu Thr
225                 230                 235                 240

Ile Phe Gly Ala Asp Gly Val Ile Ile Ala Ala Asn Val Leu Asp His
                245                 250                 255

Leu Thr Tyr Phe Gly Trp Asp Trp Ser Gly Ser Ile Leu Thr Cys Gln
            260                 265                 270

<210> SEQ ID NO 12
<211> LENGTH: 272
<212> TYPE: PRT
<213> ORGANISM: artificial sequence
<220> FEATURE:
<223> OTHER INFORMATION: Lipase mutant

<400> SEQUENCE: 12

Gln Ser Phe Thr Tyr Thr Gln Ser Leu Ala Gln Asp Leu Ala Gly Phe
1               5                   10                  15

Ser Leu Ala Ser Tyr Cys Asn Pro Lys Ser Ile Glu Gln Trp Asn Cys
                20                  25                  30

Gly Cys Ala Cys Asp Lys Asn Pro Gln Gly Leu Arg Asn Val Thr Ile
            35                  40                  45

Leu Phe Asn Ser Thr Leu Lys Ala Ser Gly Tyr Leu Gly Tyr Ser Thr
        50                  55                  60

His His Asp Ala Ile Val Val Phe Arg Gly Thr Val Pro Trp Leu
65                  70                  75                  80

Ile Glu Asn Trp Ile Ala Asp Leu Asn Thr Phe Lys Thr Gln Tyr Pro
                85                  90                  95

Leu Cys Gln Asn Cys Tyr Val His Gln Gly Phe Tyr Asn Gln Phe Lys
            100                 105                 110

Gln Leu Lys Ser Gln Leu Ile Thr Ser Phe Thr Ser Leu Arg Gln Leu
        115                 120                 125

Tyr Pro Asn Ala Lys Val Phe Val Thr Gly His Ser Leu Gly Ala Ala
    130                 135                 140

Met Ser Ala His Ser Ile Pro Val Ile Tyr Gln Leu Asn Gly Asn Lys
145                 150                 155                 160

Pro Ile Asp Ala Phe Tyr Asn Phe Gly Cys Pro Arg Val Gly Asp Gln
                165                 170                 175

Thr Tyr Ala Asn Trp Phe Asn Ser Gln Asn Phe Ala Leu Glu Tyr Gly
            180                 185                 190

Arg Ile Asn Asn Ala Ala Asp Pro Val Pro His Leu Pro Pro Leu Leu
        195                 200                 205

Tyr Pro Phe Ser Phe Phe His Tyr Asn His Glu Ile Phe Tyr Pro Ser
    210                 215                 220

Phe Val Leu Phe Gly Asn Gln His Asn Gln Cys Gln Asn Ala Glu Thr
225                 230                 235                 240

Ile Phe Gly Ala Asp Gly Val Ile Ala Ala Asn Val Leu Asp His
                245                 250                 255

Leu Thr Tyr Phe Gly Trp Asp Trp Ser Gly Ser Ile Leu Thr Cys Gln
            260                 265                 270

<210> SEQ ID NO 13
<211> LENGTH: 272
<212> TYPE: PRT
<213> ORGANISM: artificial sequence
<220> FEATURE:
<223> OTHER INFORMATION: Lipase mutant

<400> SEQUENCE: 13

Gln Ser Phe Thr Tyr Thr Gln Ser Leu Ala Gln Asp Leu Ala Gly Phe
1               5                   10                  15

Ser Leu Ala Ser Tyr Cys Asn Pro Lys Ser Ile Glu Gln Trp Asn Cys
                20                  25                  30

Gly Cys Ala Cys Asp Lys Asn Pro Gln Gly Leu Arg Asn Val Thr Ile
            35                  40                  45

Leu Phe Asn Ser Thr Leu Arg Ala Ser Gly Tyr Leu Gly Tyr Ser Thr
 50                  55                  60

His His Asp Ala Ile Ile Val Val Phe Arg Gly Thr Val Pro Trp Leu
 65                  70                  75                  80

Ile Glu Asn Trp Ile Ala Asp Leu Asn Thr Phe Lys Thr Gln Tyr Pro
                 85                  90                  95

Leu Cys Gln Asn Cys Tyr Val His Gln Gly Phe Tyr Asn Gln Phe Lys
                100                 105                 110

Gln Leu Lys Ser Gln Leu Val Thr Ser Phe Thr Ser Leu Arg Gln Leu
            115                 120                 125

Tyr Pro Asn Ala Lys Val Phe Val Thr Gly His Ser Leu Gly Ala Ala
        130                 135                 140

Met Ser Ala His Ser Ile Pro Ile Ile Tyr Gln Leu Asn Gly Asn Lys
145                 150                 155                 160

Pro Ile Asp Ala Phe Tyr Asn Tyr Gly Cys Pro Arg Val Gly Asp Gln
                165                 170                 175

Thr Tyr Ala Asn Trp Phe Asn Ser Gln Asn Phe Ala Leu Glu Tyr Gly
            180                 185                 190

Arg Ile Asn Asn Ala Ala Asp Pro Val Pro His Leu Pro Pro Leu Leu
        195                 200                 205

Tyr Pro Phe Ser Phe His Tyr Asn His Glu Ile Phe Tyr Pro Ser
    210                 215                 220

Phe Val Leu Phe Gly Asn Gln His Asn Gln Cys Gln Asn Ala Glu Thr
225                 230                 235                 240

Ile Phe Gly Ala Asp Gly Val Ile Ile Ala Ala Asn Val Leu Asp His
                245                 250                 255

Leu Thr Tyr Phe Gly Trp Asp Trp Ser Gly Ser Ile Leu Thr Cys Gln
            260                 265                 270

<210> SEQ ID NO 14
<211> LENGTH: 272
<212> TYPE: PRT
<213> ORGANISM: artificial sequence
<220> FEATURE:
<223> OTHER INFORMATION: Lipase mutant

<400> SEQUENCE: 14

Gln Ser Phe Thr Tyr Thr Gln Ser Leu Ala Gln Asp Leu Ala Gly Phe
1               5                  10                  15

Ser Leu Ala Ser Tyr Cys Asn Pro Lys Ser Ile Glu Gln Trp Asn Cys
            20                  25                  30

Gly Cys Ala Cys Asp Lys Asn Pro Gln Gly Leu Arg Asn Val Thr Ile
            35                  40                  45

Leu Phe Asn Ser Thr Leu Arg Ala Ser Gly Tyr Leu Gly Tyr Ser Thr
 50                  55                  60

His His Asp Ala Ile Val Ile Val Phe Arg Gly Thr Val Pro Trp Leu
 65                  70                  75                  80

Ile Glu Asn Trp Ile Ala Asp Leu Asn Thr Phe Lys Thr Gln Tyr Pro
                 85                  90                  95

Leu Cys Gln Asn Cys Tyr Val His Gln Gly Phe Tyr Asn Gln Phe Lys
                100                 105                 110

Gln Leu Lys Ser Gln Leu Val Thr Ser Phe Thr Ser Leu Arg Gln Leu
            115                 120                 125

Tyr Pro Asn Ala Lys Val Phe Val Thr Gly His Ser Leu Gly Ala Ala
            130                 135                 140

Met Ser Ala His Ser Ile Pro Val Ile Tyr Gln Leu Asn Gly Asn Lys
145                 150                 155                 160

Pro Ile Asp Ala Phe Tyr Asn Tyr Gly Cys Pro Arg Val Gly Asp Gln
                165                 170                 175

Thr Tyr Ala Asn Trp Phe Asn Ser Gln Asn Phe Ala Leu Glu Tyr Gly
            180                 185                 190

Arg Ile Asn Asn Ala Ala Asp Pro Val Pro His Leu Pro Pro Ile Leu
            195                 200                 205

Tyr Pro Phe Ser Phe Phe His Tyr Asn His Glu Ile Phe Tyr Pro Ser
            210                 215                 220

Phe Val Leu Phe Gly Asn Gln His Asn Gln Cys Gln Asn Ala Glu Thr
225                 230                 235                 240

Ile Phe Gly Ala Asp Gly Val Ile Ile Ala Ala Asn Val Leu Asp His
                245                 250                 255

Leu Thr Tyr Phe Gly Trp Asp Trp Ser Gly Ser Ile Leu Thr Cys Gln
            260                 265                 270

<210> SEQ ID NO 15
<211> LENGTH: 272
<212> TYPE: PRT
<213> ORGANISM: artificial sequence
<220> FEATURE:
<223> OTHER INFORMATION: Lipase mutant

<400> SEQUENCE: 15

Gln Ser Phe Thr Tyr Thr Gln Ser Leu Ala Gln Asp Leu Ala Gly Phe
1               5                   10                  15

Ser Leu Ala Ser Tyr Cys Asn Pro Lys Ser Ile Glu Gln Trp Asn Cys
            20                  25                  30

Gly Cys Ala Cys Asp Lys Asn Pro Gln Gly Leu Arg Asn Val Thr Ile
            35                  40                  45

Leu Phe Asn Ser Thr Leu Arg Ala Ser Gly Tyr Leu Gly Tyr Ser Thr
50                  55                  60

His His Asp Ala Ile Val Val Val Phe Arg Gly Thr Val Pro Trp Leu
65                  70                  75                  80

Ile Glu Asn Trp Ile Ala Asp Leu Asn Thr Phe Lys Thr Gln Tyr Pro
                85                  90                  95

Leu Cys Gln Asn Cys Tyr Val His Gln Gly Phe Tyr Asn Gln Phe Lys
            100                 105                 110

Gln Leu Lys Ser Gln Leu Ile Thr Ser Phe Thr Ser Leu Arg Gln Leu
            115                 120                 125

Tyr Pro Asn Ala Lys Val Phe Val Thr Gly His Ser Leu Gly Ala Ala
            130                 135                 140

Met Ser Ala His Ser Ile Pro Val Ile Tyr Gln Leu Asn Gly Asn Lys
145                 150                 155                 160

Pro Ile Asp Ala Phe Tyr Asn Phe Gly Cys Pro Arg Val Gly Asp Gln
                165                 170                 175

Thr Tyr Ala Asn Trp Phe Asn Ser Gln Asn Phe Ala Leu Glu Tyr Gly
            180                 185                 190

Arg Ile Asn Asn Ala Ala Asp Pro Val Pro His Leu Pro Pro Leu Leu
            195                 200                 205

Tyr Pro Phe Ser Phe Phe His Tyr Asn His Glu Ile Phe Tyr Pro Ser
            210                 215                 220

```
Phe Val Leu Phe Gly Asn Gln His Asn Gln Cys Gln Asn Ala Glu Thr
225                 230                 235                 240

Ile Phe Gly Ala Asp Gly Val Ile Ile Ala Ala Asn Val Leu Asp His
            245                 250                 255

Leu Thr Tyr Phe Gly Trp Asp Trp Ser Gly Ser Ile Leu Thr Cys Gln
            260                 265                 270
```

<210> SEQ ID NO 16
<211> LENGTH: 272
<212> TYPE: PRT
<213> ORGANISM: artificial sequence
<220> FEATURE:
<223> OTHER INFORMATION: Lipase mutant

<400> SEQUENCE: 16

```
Gln Ser Phe Thr Tyr Thr Gln Ser Leu Ala Gln Asp Leu Ala Gly Phe
1               5                   10                  15

Ser Leu Ala Ser Tyr Cys Asn Pro Lys Ser Ile Glu Gln Trp Asn Cys
            20                  25                  30

Gly Cys Ala Cys Asp Lys Asn Pro Gln Gly Leu Arg Asn Val Thr Ile
        35                  40                  45

Leu Phe Asn Ser Thr Leu His Ala Ser Gly Tyr Leu Gly Tyr Ser Thr
50                  55                  60

His His Asp Ala Ile Ile Val Val Phe Arg Gly Thr Val Pro Trp Leu
65                  70                  75                  80

Ile Glu Asn Trp Ile Ala Asp Leu Asn Thr Phe Lys Thr Gln Tyr Pro
                85                  90                  95

Leu Cys Gln Asn Cys Tyr Val His Gln Gly Phe Tyr Asn Gln Phe Lys
            100                 105                 110

Gln Leu Lys Ser Gln Leu Val Thr Ser Phe Thr Ser Leu Arg Gln Leu
        115                 120                 125

Tyr Pro Asn Ala Lys Val Phe Val Thr Gly His Ser Leu Gly Ala Ala
130                 135                 140

Met Ser Ala His Ser Ile Pro Ile Ile Tyr Gln Leu Asn Gly Asn Lys
145                 150                 155                 160

Pro Ile Asp Ala Phe Tyr Asn Tyr Gly Cys Pro Arg Val Gly Asp Gln
                165                 170                 175

Thr Tyr Ala Asn Trp Phe Asn Ser Gln Asn Phe Ala Leu Glu Tyr Gly
            180                 185                 190

Arg Ile Asn Asn Ala Ala Asp Pro Val Pro His Leu Pro Pro Leu Leu
        195                 200                 205

Tyr Pro Phe Ser Phe Phe His Tyr Asn His Glu Ile Phe Tyr Pro Ser
210                 215                 220

Phe Val Leu Phe Gly Asn Gln His Asn Gln Cys Gln Asn Ala Glu Thr
225                 230                 235                 240

Ile Phe Gly Ala Asp Gly Val Ile Ile Ala Ala Asn Val Leu Asp His
                245                 250                 255

Leu Thr Tyr Phe Gly Trp Asp Trp Ser Gly Ser Ile Leu Thr Cys Gln
            260                 265                 270
```

<210> SEQ ID NO 17
<211> LENGTH: 272
<212> TYPE: PRT
<213> ORGANISM: artificial sequence
<220> FEATURE:
<223> OTHER INFORMATION: Lipase mutant -continued

<400> SEQUENCE: 17

Gln Ser Phe Thr Tyr Thr Gln Ser Leu Ala Gln Asp Leu Ala Gly Phe
1               5                   10                  15

Ser Leu Ala Ser Tyr Cys Asn Pro Lys Ser Ile Glu Gln Trp Asn Cys
            20                  25                  30

Gly Cys Ala Cys Asp Lys Asn Pro Gln Gly Leu Arg Asn Val Thr Ile
        35                  40                  45

Leu Phe Asn Ser Thr Leu His Ala Ser Gly Tyr Leu Gly Tyr Ser Thr
    50                  55                  60

His His Asp Ala Ile Val Ile Val Phe Arg Gly Thr Val Pro Trp Leu
65                  70                  75                  80

Ile Glu Asn Trp Ile Ala Asp Leu Asn Thr Phe Lys Thr Gln Tyr Pro
                85                  90                  95

Leu Cys Gln Asn Cys Tyr Val His Gln Gly Phe Tyr Asn Gln Phe Lys
            100                 105                 110

Gln Leu Lys Ser Gln Leu Val Thr Ser Phe Thr Ser Leu Arg Gln Leu
        115                 120                 125

Tyr Pro Asn Ala Lys Val Phe Val Thr Gly His Ser Leu Gly Ala Ala
    130                 135                 140

Met Ser Ala His Ser Ile Pro Val Ile Tyr Gln Leu Asn Gly Asn Lys
145                 150                 155                 160

Pro Ile Asp Ala Phe Tyr Asn Tyr Gly Cys Pro Arg Val Gly Asp Gln
                165                 170                 175

Thr Tyr Ala Asn Trp Phe Asn Ser Gln Asn Phe Ala Leu Glu Tyr Gly
            180                 185                 190

Arg Ile Asn Asn Ala Ala Asp Pro Val Pro His Leu Pro Pro Ile Leu
        195                 200                 205

Tyr Pro Phe Ser Phe His Tyr Asn His Glu Ile Phe Tyr Pro Ser
    210                 215                 220

Phe Val Leu Phe Gly Asn Gln His Asn Gln Cys Gln Asn Ala Glu Thr
225                 230                 235                 240

Ile Phe Gly Ala Asp Gly Val Ile Ile Ala Ala Asn Val Leu Asp His
                245                 250                 255

Leu Thr Tyr Phe Gly Trp Asp Trp Ser Gly Ser Ile Leu Thr Cys Gln
            260                 265                 270

<210> SEQ ID NO 18
<211> LENGTH: 272
<212> TYPE: PRT
<213> ORGANISM: artificial sequence
<220> FEATURE:
<223> OTHER INFORMATION: Lipase mutant

<400> SEQUENCE: 18

Gln Ser Phe Thr Tyr Thr Gln Ser Leu Ala Gln Asp Leu Ala Gly Phe
1               5                   10                  15

Ser Leu Ala Ser Tyr Cys Asn Pro Lys Ser Ile Glu Gln Trp Asn Cys
            20                  25                  30

Gly Cys Ala Cys Asp Lys Asn Pro Gln Gly Leu Arg Asn Val Thr Ile
        35                  40                  45

Leu Phe Asn Ser Thr Leu His Ala Ser Gly Tyr Leu Gly Tyr Ser Thr
    50                  55                  60

His His Asp Ala Ile Val Val Phe Arg Gly Thr Val Pro Trp Leu
65                  70                  75                  80

```
Ile Glu Asn Trp Ile Ala Asp Leu Asn Thr Phe Lys Thr Gln Tyr Pro
                85                  90                  95
Leu Cys Gln Asn Cys Tyr Val His Gln Gly Phe Tyr Asn Gln Phe Lys
            100                 105                 110
Gln Leu Lys Ser Gln Leu Ile Thr Ser Phe Thr Ser Leu Arg Gln Leu
        115                 120                 125
Tyr Pro Asn Ala Lys Val Phe Val Thr Gly His Ser Leu Gly Ala Ala
    130                 135                 140
Met Ser Ala His Ser Ile Pro Val Ile Tyr Gln Leu Asn Gly Asn Lys
145                 150                 155                 160
Pro Ile Asp Ala Phe Tyr Asn Phe Gly Cys Pro Arg Val Gly Asp Gln
                165                 170                 175
Thr Tyr Ala Asn Trp Phe Asn Ser Gln Asn Phe Ala Leu Glu Tyr Gly
            180                 185                 190
Arg Ile Asn Asn Ala Ala Asp Pro Val Pro His Leu Pro Pro Leu Leu
        195                 200                 205
Tyr Pro Phe Ser Phe Phe His Tyr Asn His Glu Ile Phe Tyr Pro Ser
    210                 215                 220
Phe Val Leu Phe Gly Asn Gln His Asn Gln Cys Gln Asn Ala Glu Thr
225                 230                 235                 240
Ile Phe Gly Ala Asp Gly Val Ile Ile Ala Ala Asn Val Leu Asp His
                245                 250                 255
Leu Thr Tyr Phe Gly Trp Asp Trp Ser Gly Ser Ile Leu Thr Cys Gln
            260                 265                 270
```